US012295038B2

(12) United States Patent
Kwak et al.

(10) Patent No.: US 12,295,038 B2
(45) Date of Patent: May 6, 2025

(54) CHANNEL REPETITIONS FOR 2-STEP RACH PROCEDURE

(71) Applicant: QUALCOMM Incorporated, San Diego, CA (US)

(72) Inventors: Yongjun Kwak, San Diego, CA (US); Jing Lei, San Diego, CA (US); Huilin Xu, Temecula, CA (US); Hung Dinh Ly, San Diego, CA (US); Yuchul Kim, San Diego, CA (US); Seyedkianoush Hosseini, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/464,493

(22) Filed: Sep. 1, 2021

(65) Prior Publication Data
US 2022/0110163 A1    Apr. 7, 2022

Related U.S. Application Data

(60) Provisional application No. 63/088,959, filed on Oct. 7, 2020.

(51) Int. Cl.
*H04W 74/0833*    (2024.01)
*H04L 1/08*    (2006.01)
(Continued)

(52) U.S. Cl.
CPC ........... *H04W 74/0833* (2013.01); *H04L 1/08* (2013.01); *H04W 24/10* (2013.01); *H04W 64/003* (2013.01); *H04W 74/0836* (2024.01)

(58) Field of Classification Search
CPC ..... H04W 72/21; H04W 72/23; H04W 48/12; H04W 74/006; H04W 72/1268;
(Continued)

(56) References Cited

U.S. PATENT DOCUMENTS

2015/0181533 A1* 6/2015 Chen ..................... H04W 52/50
455/522
2020/0100297 A1* 3/2020 Agiwal ............. H04W 74/0833
(Continued)

OTHER PUBLICATIONS

"Discussion on Coverage enhancements for channels other than PUCCH and PUSCH", Aug. 17-28, 2020, Vivo, pp. 3-4 (Year: 2020).*

(Continued)

*Primary Examiner* — Kwang B Yao
*Assistant Examiner* — Bradley D Lytle, Jr.
(74) *Attorney, Agent, or Firm* — Holland & Hart LLP

(57) ABSTRACT

Methods, systems, and devices for wireless communications are described. A base station determines configuration information for a random access procedure, where the configuration information includes a repetition pattern associated with a first message of the random access procedure. A user equipment (UE) receives, from the base station, a configuration message that indicates the configuration information for the random access procedure. The UE determines a repetition pattern associated with a first message of the random access procedure based on the configuration information. The base station receives, from the UE, multiple instances of the first message based on the repetition pattern.

22 Claims, 18 Drawing Sheets

(51) Int. Cl.
*H04W 24/10* (2009.01)
*H04W 64/00* (2009.01)
*H04W 74/0836* (2024.01)

(58) Field of Classification Search
CPC .............. H04W 74/004; H04W 74/04; H04W 74/0866; H04W 74/02; H04W 74/0833; H04W 76/15; H04W 24/10; H04W 64/003; H04L 5/0048
See application file for complete search history.

(56) References Cited

U.S. PATENT DOCUMENTS

2020/0396744 A1* 12/2020 Xiong .................... H04B 7/088
2021/0127409 A1* 4/2021 Park .................. H04W 74/0866

OTHER PUBLICATIONS

International Search Report and Written Opinion—PCT/US2021/048796—ISA/EPO—Dec. 22, 2021 (208369WO).
Vivo: "Discussion on Coverage Enhancements for Channels Other than PUCCH and PUSCH", 3GPP Draft, 3GPP TSG RAN WG1 #102, R1-2005397, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917422, 4 Pages, Retrieved from the Internet: URL: https://ftp.3gpp.org/tsg_ran/WG1_RL1/TSGR1_102-e/Docs/R1-2005397.zip. R1-2005397, Discussion on Coverage Enhancement for Channels Other than PUCCH and PUSCH.docx. [Retrieved on Aug. 8, 2020], Paragraph [03.1].

* cited by examiner

CHANNEL REPETITIONS FOR 2-STEP RACH PROCEDURE

CROSS REFERENCE

The present application for patent claims the benefit of U.S. Provisional Patent Application No. 63/088,959 by KWAK et al., entitled "CHANNEL REPETITIONS FOR 2-STEP RACH PROCEDURE," filed Oct. 7, 2020, assigned to the assignee hereof, and expressly incorporated by reference herein.

FIELD OF TECHNOLOGY

The following relates to wireless communications, including channel repetitions for 2-step random access channel (RACH) procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support random access procedures for establishing communications between a UE and a base station. The random access procedure may involve a series of handshake messages between the UE and the base station.

SUMMARY

The described techniques relate to improved methods, systems, devices, and apparatuses that support channel repetitions for 2-step RACH procedure. Generally, the described techniques provide for a base station determining configuration information for a random access procedure, where the configuration information includes a repetition pattern associated with a first message of the random access procedure. A user equipment (UE) receives, from the base station, a configuration message that indicates the configuration information for the random access procedure. The UE determines a repetition pattern associated with a first message of the random access procedure based on the configuration information. The base station receives, from the UE, multiple instances of the first message based on the repetition pattern.

A method of wireless communication by a UE is described. The method may include receiving, from a base station, a configuration message that indicates configuration information for a random access procedure, determining a repetition pattern associated with a first message of the random access procedure based on the configuration information, and transmitting, to the base station, multiple instances of the first message based on the repetition pattern.

An apparatus for wireless communication by a UE is described. The apparatus may include a processor, memory coupled with the processor, and instructions stored in the memory. The instructions may be executable by the processor to cause the apparatus to receive, from a base station, a configuration message that indicates configuration information for a random access procedure, determine a repetition pattern associated with a first message of the random access procedure based on the configuration information, and transmit, to the base station, multiple instances of the first message based on the repetition pattern.

Another apparatus for wireless communication by a UE is described. The apparatus may include means for receiving, from a base station, a configuration message that indicates configuration information for a random access procedure, determining a repetition pattern associated with a first message of the random access procedure based on the configuration information, and transmitting, to the base station, multiple instances of the first message based on the repetition pattern.

A non-transitory computer-readable medium storing code for wireless communication by a UE is described. The code may include instructions executable by a processor to receive, from a base station, a configuration message that indicates configuration information for a random access procedure, determine a repetition pattern associated with a first message of the random access procedure based on the configuration information, and transmit, to the base station, multiple instances of the first message based on the repetition pattern.

Some examples of the method, apparatuses, and non-transitory computer-readable medium described herein may further include operations, features, means, or instructions for monitoring for a second message of the random access procedure from the base station based on the configuration information.

Some examples of the method, apparatuses, and non-transitory computer-readable medium described herein may further include operations, features, means, or instructions for detecting the second message based on the monitoring, and ceasing the transmitting of the multiple instances of the first message based on detecting the second message.

Some examples of the method, apparatuses, and non-transitory computer-readable medium described herein may further include operations, features, means, or instructions for ceasing the monitoring for the second message based on detecting the second message.

Some examples of the method, apparatuses, and non-transitory computer-readable medium described herein may further include operations, features, means, or instructions for initiating the monitoring after transmitting a first instance of the multiple instances of the first message and before transmitting a last instance of the multiple instances of the first message.

In some examples of the method, apparatuses, and non-transitory computer-readable medium described herein, the second message of the random access procedure includes a physical downlink control channel or a physical downlink shared channel, or both.

Some examples of the method, apparatuses, and non-transitory computer-readable medium described herein may further include operations, features, means, or instructions for receiving the configuration information in a radio resource control message or a synchronization signal block message, or both.

Some examples of the method, apparatuses, and non-transitory computer-readable medium described herein may further include operations, features, means, or instructions for determining that the repetition pattern indicates repeated transmissions of a pair of physical random access channel and physical uplink shared channel.

Some examples of the method, apparatuses, and non-transitory computer-readable medium described herein may further include operations, features, means, or instructions for determining that the repetition pattern indicates repeated transmissions of a physical random access channel followed by repeated transmissions of a physical uplink shared channel subsequent to a last instance of the repeated transmissions of the physical random access channel.

Some examples of the method, apparatuses, and non-transitory computer-readable medium described herein may further include operations, features, means, or instructions for determining a timing configuration of time resources associated with the transmitting of the multiple instances of the first message based on the configuration information.

Some examples of the method, apparatuses, and non-transitory computer-readable medium described herein may further include operations, features, means, or instructions for determining, based on the configuration information, a time gap configuration of the multiple instances of the first message indicating a spacing between a physical random access channel and a physical uplink shared channel, or a spacing between a first instance of a physical random access channel and a second instance of a physical random access channel, or a spacing between a first instance of a physical uplink shared channel and a second instance of a physical uplink shared channel, or a spacing between a first pair of physical random access channel and physical uplink shared channel and a second pair of physical random access channel and physical uplink shared channel, or any combination thereof.

Some examples of the method, apparatuses, and non-transitory computer-readable medium described herein may further include operations, features, means, or instructions for determining, based on the configuration information, a number of transmissions of a physical random access channel to be included in the transmitting of the multiple instances of the first message, and determining, based on the configuration information, a number of transmissions of a physical uplink shared channel to be included in the transmitting of the multiple instances of the first message.

In some examples of the method, apparatuses, and non-transitory computer-readable medium described herein, the number of transmissions of the physical random access channel may be based on a channel condition associated with the physical random access channel or on a reference signal received power (RSRP) of a synchronization signal block (SSB) associated with the physical random access channel, or both.

In some examples of the method, apparatuses, and non-transitory computer-readable medium described herein, the number of transmissions of the physical uplink shared channel may be based on a channel condition associated with the physical uplink shared channel or on a reference signal received power (RSRP) of a synchronization signal block (SSB) associated with the physical uplink shared channel, or both.

In some examples of the method, apparatuses, and non-transitory computer-readable medium described herein, the number of transmissions of the physical random access channel may be equal to or different from the number of transmissions of the physical uplink shared channel.

In some examples of the method, apparatuses, and non-transitory computer-readable medium described herein, the random access procedure includes a two-step random access procedure.

A method of wireless communication by a base station is described. The method may include determining configuration information for a random access procedure, the configuration information including a repetition pattern associated with a first message of the random access procedure, transmitting, to a UE, a configuration message that indicates the configuration information for the random access procedure, and receiving, from the UE, multiple instances of the first message based on the repetition pattern.

An apparatus for wireless communication by a base station is described. The apparatus may include a processor, memory coupled with the processor, and instructions stored in the memory. The instructions may be executable by the processor to cause the apparatus to determine configuration information for a random access procedure, the configuration information including a repetition pattern associated with a first message of the random access procedure, transmit, to a UE, a configuration message that indicates the configuration information for the random access procedure, and receive, from the UE, multiple instances of the first message based on the repetition pattern.

Another apparatus for wireless communication by a base station is described. The apparatus may include means for determining configuration information for a random access procedure, the configuration information including a repetition pattern associated with a first message of the random access procedure, transmitting, to a UE, a configuration message that indicates the configuration information for the random access procedure, and receiving, from the UE, multiple instances of the first message based on the repetition pattern.

A non-transitory computer-readable medium storing code for wireless communication by a base station is described. The code may include instructions executable by a processor to determine configuration information for a random access procedure, the configuration information including a repetition pattern associated with a first message of the random access procedure, transmit, to a UE, a configuration message that indicates the configuration information for the random access procedure, and receive, from the UE, multiple instances of the first message based on the repetition pattern.

Some examples of the method, apparatuses, and non-transitory computer-readable medium described herein may further include operations, features, means, or instructions for transmitting, to the UE, a second message of the random access procedure based on a first instance of the multiple instances of the first message that may be detected by the base station.

Some examples of the method, apparatuses, and non-transitory computer-readable medium described herein may further include operations, features, means, or instructions for discarding any subsequent instances of the multiple instances of the first message after the detecting of the first instance of the multiple instances of the first message.

In some examples of the method, apparatuses, and non-transitory computer-readable medium described herein, the detecting of the first instance of the multiple instances may include operations, features, means, or instructions for detecting at least one instance of a physical random access channel and at least one instance of a physical uplink shared channel from the UE.

In some examples of the method, apparatuses, and non-transitory computer-readable medium described herein, the second message of the random access procedure includes a physical downlink control channel or a physical downlink shared channel, or both.

Some examples of the method, apparatuses, and non-transitory computer-readable medium described herein may further include operations, features, means, or instructions for transmitting the configuration information in a radio resource control message or a synchronization signal block message, or both.

Some examples of the method, apparatuses, and non-transitory computer-readable medium described herein may further include operations, features, means, or instructions for configuring the repetition pattern to indicate repeated transmissions of a pair of physical random access channel and physical uplink shared channel.

Some examples of the method, apparatuses, and non-transitory computer-readable medium described herein may further include operations, features, means, or instructions for configuring the repetition pattern to indicate repeated transmissions of a physical random access channel followed by repeated transmissions of a physical uplink shared channel subsequent to a last instance of the repeated transmissions of the physical random access channel.

Some examples of the method, apparatuses, and non-transitory computer-readable medium described herein may further include operations, features, means, or instructions for configuring the configuration information to include a timing configuration of time resources associated with the multiple instances of the first message.

Some examples of the method, apparatuses, and non-transitory computer-readable medium described herein may further include operations, features, means, or instructions for configuring the configuration information to include a time gap configuration of the multiple instances of the first message, the time gap configuration indicating a spacing between a physical random access channel and a physical uplink shared channel, or a spacing between a first instance of a physical random access channel and a second instance of a physical random access channel, or a spacing between a first instance of a physical uplink shared channel and a second instance of a physical uplink shared channel, or a spacing between a first pair of physical random access channel and physical uplink shared channel and a second pair of physical random access channel and physical uplink shared channel, or any combination thereof.

Some examples of the method, apparatuses, and non-transitory computer-readable medium described herein may further include operations, features, means, or instructions for configuring the configuration information to indicate a number of transmissions of a physical random access channel to be included in the multiple instances of the first message, and configuring the configuration information to indicate a number of transmissions of a physical uplink shared channel to be included in the multiple instances of the first message.

Some examples of the method, apparatuses, and non-transitory computer-readable medium described herein may further include operations, features, means, or instructions for basing the number of transmissions of the physical random access channel at least in part on a channel condition associated with the physical random access channel or on a reference signal received power (RSRP) of a synchronization signal block (SSB) associated with the physical random access channel, or both.

Some examples of the method, apparatuses, and non-transitory computer-readable medium described herein may further include operations, features, means, or instructions for basing the number of transmissions of the physical uplink shared channel at least in part on a channel condition associated with the physical uplink shared channel or on a reference signal received power (RSRP) of a synchronization signal block (SSB) associated with the physical uplink shared channel, or both.

Some examples of the method, apparatuses, and non-transitory computer-readable medium described herein may further include operations, features, means, or instructions for setting the number of transmissions of the physical random access channel to be equal to or different from the number of transmissions of the physical uplink shared channel.

In some examples of the method, apparatuses, and non-transitory computer-readable medium described herein, the random access procedure includes a two-step random access procedure.

DETAILED DESCRIPTION

Figure 1:
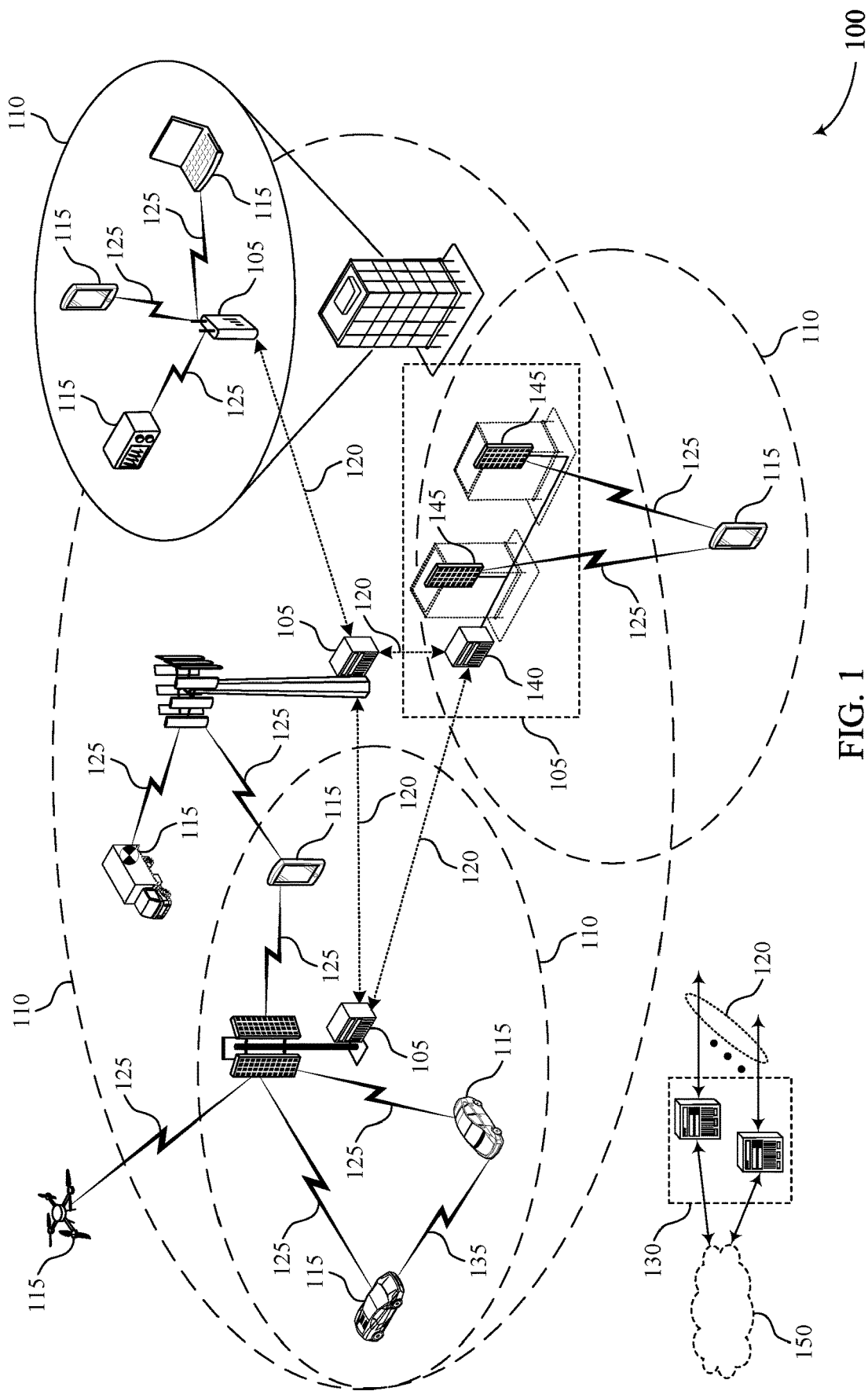
FIG. 1 illustrates an example of a system for wireless communications that supports channel repetitions for 2-step RACH procedure in accordance with aspects of the present disclosure.

In some examples, wireless systems may support random access procedures for establishing communications between a user equipment (UE) and a base station. The random access procedure may involve a series of handshake messages between the UE and the base station. In some cases, a UE may use a 2-step random access procedure to establish communications with a base station. However, existing random access procedures, including 2-step random access procedures, may suffer from inefficiencies in some environments (e.g., environments with low-power internet of things device, set and forget devices, etc.). In some cases, quality of service constraints on existing random access procedures may detrimentally affect peak throughput, latency, and reliability, while reducing coverage and increasing power consumption for some devices. Accordingly, it may be desirable to improve efficiencies and power savings, while reducing latencies that are associated with some random access procedures or some environments associated with random access procedures.

The present techniques improve power savings and coverage by providing channel repetitions in random access procedures (e.g., channel repetitions in two-step random access channel). The present techniques include a UE repeatedly transmitting a first message (e.g., message A in a two-step random access procedure). The first message may include a physical random access channel or a physical uplink shared channel, or both. The first message may include a physical random access channel paired with a physical uplink shared channel. Thus, the UE may repeatedly transmit pairs of physical random access channel and physical uplink shared channel. In some examples, the UE may repeatedly transmit a physical random access channel a set number of times and then repeatedly transmit a physical uplink shared channel a set number of times. A base station may repeatedly transmit a second message (e.g., message B in a two-step random access procedure). In some examples, the UE may monitor for the second message from the base station. The base station may initiate the repeated transmissions of the second message after detecting at least one instance of the first message (e.g., at least one physical random access channel or at least one physical uplink shared channel). When the UE detects the second message from the base station based on the monitoring, the UE may cease the repeated transmissions of the first message. The UE may stop monitoring for the second message after detecting at least one instance of the second message from the base station.

Aspects of the subject matter described herein may be implemented to realize one or more advantages. The described techniques may support improvements in system efficiency such that a device (e.g., a device in a low power wide area (LPWA) network, a metering device, asset tracking device, personal internet-of-things device, etc.) operates with improved coverage and reduced power consumption. Additionally, described techniques may result in avoiding multiple retransmissions and failed transmissions, relaxing peak throughput constraints, relaxing latency and reliability constraints, decreasing system latency, improving the reliability of a decoding procedure for uplink transmissions at a base station, and improving user experience.

Aspects of the disclosure are initially described in the context of wireless communications systems. Aspects of the disclosure are further illustrated by and described with reference to additional system diagrams, environments of wireless communications systems, and process flows that relate to channel repetitions for 2-step RACH procedure. Aspects of the disclosure are further illustrated by and described with reference to apparatus diagrams, system diagrams, and flowcharts that relate to channel repetitions for 2-step RACH procedure.

FIG. 1 illustrates an example of a wireless communications system 100 that supports channel repetitions for 2-step RACH procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE (e.g., a UE 115 of FIG. 1) may perform random access procedures for establishing communications between the UE and a base station (e.g., a base station 105 of FIG. 1). The random access procedure may involve a series of handshake messages between the UE and the base station. In some cases, the UE and base station may improve the throughput associated with the random access procedure based on channel repetitions for 2-step RACH procedures. In some cases, the base station may determine configuration information for a random access procedure, where the configuration information includes a repetition pattern associated with a first message of the random access procedure. In some cases, the UE may receive, from the base station, a configuration message that indicates the configuration information for the random access procedure. The UE may determine a repetition pattern associated with a first message of the random access procedure based on the configuration information. The base station may receive, from the UE, multiple instances of the first message based on the repetition pattern. Accordingly, the UE and base station may improve throughput, coverage, and power consumption based on channel repetitions for 2-step RACH procedures.

Figure 2:
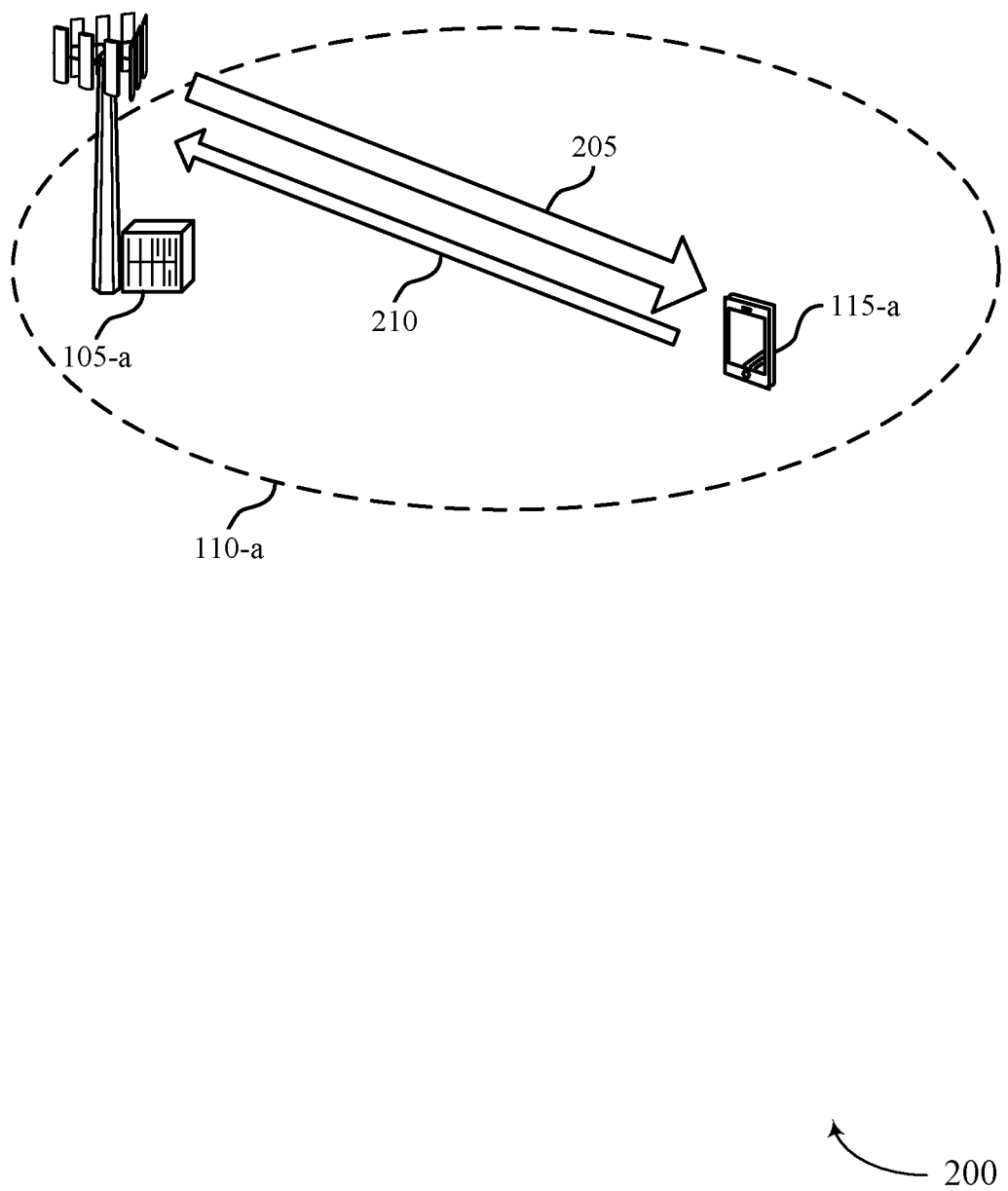
FIG. 2 illustrates an example of a system for wireless communications that supports channel repetitions for 2-step RACH procedure in accordance with aspects of the present disclosure.

FIG. 2 illustrates an example of a system for wireless communications 200 that supports channel repetitions for 2-step RACH procedure in accordance with aspects of the present disclosure. In some examples, system for wireless communications 200 may implement aspects of wireless communication system 100.

As illustrated, system 200 may include UE 115-a and base station 105-a, which may be examples of a UE 115 or a base station 105, as described herein with reference to FIG. 1. System 200 may also include downlink 205 and uplink 210. Base station 105-a may use downlink 205 to convey control or data information, or both, to UE 115-a. And UE 115-a may use uplink 210 to convey control or data information, or both to base station 105-a. In some cases, downlink 205 may use different time or frequency resources, or both, than uplink 210.

In some examples, UE 115-a may perform random access procedures for establishing communications between UE 115-a and base station 105-a (e.g., downlink 205, uplink 210). The random access procedure may involve a series of handshake messages between UE 115-a and base station 105-a. In some cases, UE 115-a and base station 105-a may improve the throughput associated with the random access procedure based on channel repetitions for 2-step random access procedures. In some cases, the 2-step random access procedure may include UE 115-a transmitting a message A (e.g., 2-step random access message A) to base station 105-a, and base station 105-a transmitting a message B (e.g., 2-step random access message B) to UE 115-a.

In some cases, base station 105-a may determine configuration information for a random access procedure, where the configuration information includes a repetition pattern for a first message of the random access procedure. In some cases, UE 115-a may receive, from the base station 105-a via downlink 205, a configuration message that indicates the configuration information for the random access procedure. Based on the configuration information, UE 115-a may determine a repetition pattern associated with a first message of the random access procedure and, via uplink 210, may initiate transmitting a set number of instances of the first message (e.g., the set number being indicated by the configuration information). The base station 105-a may receive, from the UE 115-a via uplink 210, one or more instances of the first message based on the repetition pattern. In some cases, base station 105-a may transmit, to UE 115-a via downlink 205, one or more instances of a second message of the random access procedure.

Figure 3:
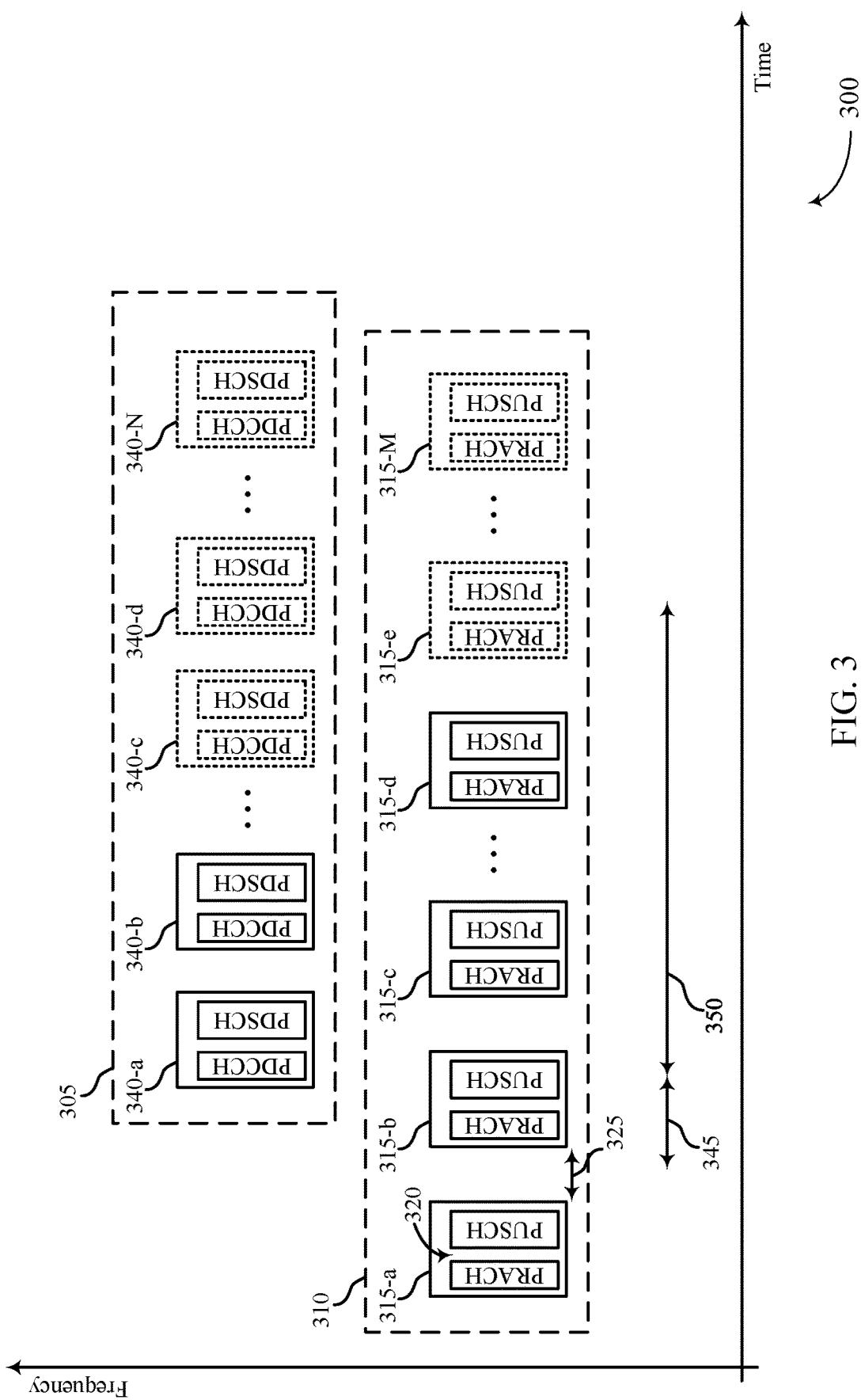
FIG. 3 illustrates an example of an environment that supports channel repetitions for 2-step RACH procedure in accordance with aspects of the present disclosure.

FIG. 3 illustrates an example of an environment 300 that supports channel repetitions for 2-step RACH procedure in accordance with aspects of the present disclosure. In some examples, environment 300 may implement aspects of wireless communication system 100.

In the illustrated example, environment 300 may include downlink 305 and uplink 310. In some examples, downlink 305 may be an example of downlink 205 of FIG. 2, and uplink 310 may be an example of uplink 210 of FIG. 2. In some cases, downlink 305 may use different time or frequency resources, or both, than uplink 310. In some cases, downlink 305 may use at least part of the same time or frequency resources, or both, as uplink 310. Even though the frequency of uplink 310 is depicted as occupying higher frequency resources, it is understood that the frequency resources of the uplink 310 may be higher, lower, or at least partially overlap the frequency resources of downlink 305.

In some cases, a UE and base station may improve coverage and throughput associated with channel repetitions for 2-step random access procedures of environment 300. In some cases, the 2-step random access procedure may include a UE transmitting a message A (e.g., 2-step random access message A) to a base station, and the base station transmitting a message B (e.g., 2-step random access message B) to the UE. In the illustrated example, uplink 310 may include M instances of a message A 315 (e.g., message A 315-a, message A 315-b, etc.). Downlink 305 may include N instances of a message B 340 (e.g., message B 340-a, message B 340-b, etc.). In some cases, M equals N, or M has a different value than N. As shown, each instance of message A 315 may include a physical random access channel (PRACH) paired with a physical uplink shared channel (PUSCH), and each instance of message B 340 may include a physical downlink control channel (PDCCH) or a physical downlink shared channel (PDSCH), or both.

In some examples, the base station may transmit, to the UE, a configuration message that indicates configuration information for a random access procedure (e.g., the 2-step random access procedure). In some cases, the configuration message may indicate a repetition number (e.g., the value M or the value N, or both) to the UE. In some cases, the configuration information may indicate a frequency hopping configuration for the M instances of message A 315. In some cases, the configuration message may indicate a pattern associated with the M instances of message A 315. In some cases, the pattern may be configured by system information block (e.g., SIB1) or radio resource control (RRC, dedicated RRC, etc.). In some cases, the pattern may indicate one or more time gaps associated with the M instances of message A 315. In some cases, the indicated time gaps may include intra gap 320 and inner gap 325. As shown, intra gap 320 may indicate a time gap between a PRACH and PUSCH pair within a single instance of message A 315. As shown, inner gap 325 may indicate a time gap between a first instance of message A and a second instance of message A (e.g., a time gap between message A 315-a and message A 315-b, etc.). In some cases, the configuration information may indicate an offset 345 for a random access response (RAR) window 350.

In some examples, a UE may initiate transmission of the M instances of message A 315 based on the configuration information. Accordingly, the UE may transmit message A 315-a, then transmit message A 315-b, and so on.

In some examples, the UE may monitor for an instance of message B 340 (e.g., message B 340-a, etc.) from base station. In some cases, the UE may monitor for instances of message B 340 during RAR window 350. In some cases, the UE may initiate the monitoring for instances of message B 340 before transmitting a last instance of message A 315 (e.g., message A 315-M). In some cases, the UE may initiate the monitoring for instances of message B 340 after transmitting a first instance of message A 315 (e.g., message A 315-a). In some cases, the UE may initiate the monitoring for instances of message B 340 before transmitting a second instance of message A 315. In some cases, the UE may initiate the monitoring for instances of message B 340 from the base station after offset 345 that may be indicated in the configuration information. In some cases, the offset 345 may be based off of when the first instance of message A 315 is transmitted (e.g., message A 315-a).

In some examples, the base station may detect at least one message A (e.g., at least message A 315-a) transmitted by the UE. In some cases, the base station may stop detecting message A repetitions from the UE based on the base station receiving at least one instance of a message A PRACH and at least one instance of a message A PUSCH from the UE. In some cases, the UE may continue transmitting instances of message A 315 after the base station stops detecting instances of message A 315.

In some examples, the base station may initiate transmission of instances of message B 340. In some cases, the base station may initiate transmission of instances of message B 340 based on base station detecting at least one instance of message A 315. In some cases, at least some instances of message B 340 may include a physical downlink control channel (PDCCH), or at least some instances of message B 340 may include a physical downlink shared channel (PDSCH), or at least some instances of message B 340 may include both a PDCCH and a PDSCH, or any combination thereof. Accordingly, the base station initiating transmission of instances of message B 340 may include the base station generating a message B 340 (e.g., at least one PDCCH or least one PDSCH, or both), transmitting a first instance of the message B (e.g., message B 340-*a*), transmitting a second instance of the message B (e.g., message B 340-*b*), and so on.

In some examples, the UE may detect at least one message B 340 (e.g., at least message B 340-*a*, etc.) transmitted by the base station. In some cases, the UE may receive one or more instances of message B 340 that the base station transmits based on the monitoring for instances of message B 340 by the UE.

In some examples, the UE may stop monitoring for instances of message B 340 from the base station based on the UE receiving at least one message B 340 (e.g., least one message B PDCCH and at least one message B PDSCH; i.e., a random access response (RAR)). In some cases, the base station may continue transmitting instances of message B 340 after the UE stops monitoring for the instances of message B 340 transmitted by the base station. In some cases, the UE may stop transmitting instances of message A 315 based on the UE receiving at least one instances of message B 340 transmission (e.g., the UE stops transmitting instances of message A 315 starting with message A 315-*e*).

In some examples, the UE may transmit feedback to the base station. In some examples, the base station may stop transmitting instances of message B 340 based on base station receiving the feedback sent by UE at 445 (e.g., the base station stops transmitting instances of message B 340 starting with message B 340-*c*).

The present techniques may reduce power consumption and free up processing cycles of one or more devices (e.g., low-power devices, battery-operated devices, a UE 115 of FIG. 1, etc.) by random access procedure based on channel repetitions for 2-step RACH procedures, thus improving user experience of the one or more devices with longer battery life and improved quality of service. In some cases, one or more devices (e.g., a base station 105, a network device, a network router, a network gateway, etc.) may support and manage random access procedure based on channel repetitions for 2-step RACH procedures of a given environment (e.g., environment 300).

Figure 4:
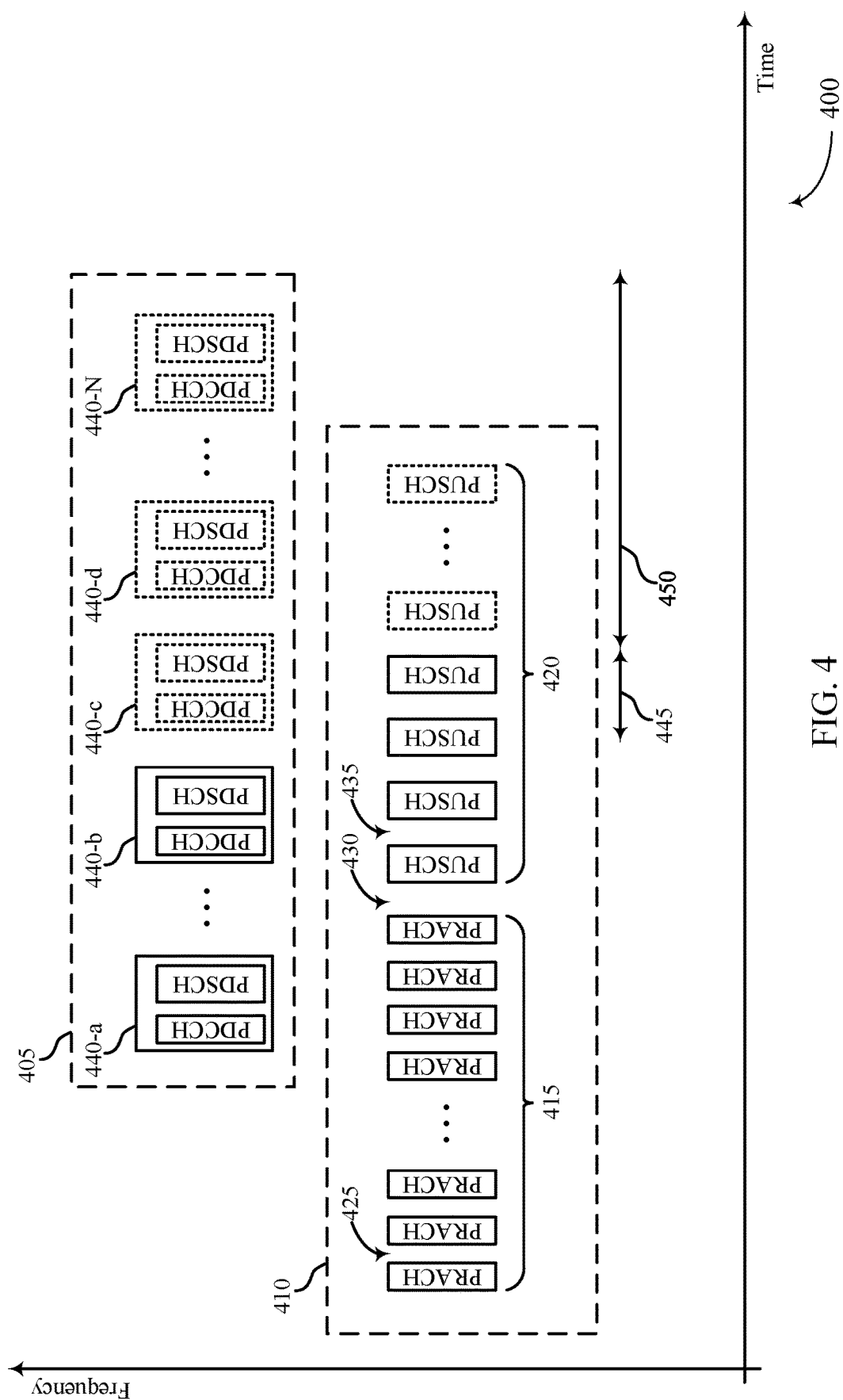
FIG. 4 illustrates an example of an environment that supports channel repetitions for 2-step RACH procedure in accordance with aspects of the present disclosure.

FIG. 4 illustrates an example of an environment 400 that supports channel repetitions for 2-step RACH procedure in accordance with aspects of the present disclosure. In some examples, environment 400 may implement aspects of wireless communication system 100.

In the illustrated example, environment 400 may include downlink 405 and uplink 410. In some examples, downlink 405 may be an example of downlink 205 of FIG. 2 or downlink 305 of FIG. 3, and uplink 410 may be an example of uplink 210 of FIG. 2 or uplink 310 of FIG. 3. In some cases, downlink 405 may use different time or frequency resources, or both, than uplink 410. In some cases, downlink 405 may use at least part of the same time or frequency resources, or both, as uplink 410. Even though the frequency of uplink 410 is depicted as occupying higher frequency resources, it is understood that the frequency resources of the uplink 410 may be higher, lower, or at least partially overlap the frequency resources of downlink 405.

In some cases, a UE and base station may improve coverage and throughput associated with channel repetitions for 2-step random access procedures of environment 400. In some cases, the 2-step random access procedure may include a UE transmitting message A repetitions (e.g., 2-step random access message A repetitions) to a base station, and the base station transmitting message B repetitions (e.g., 2-step random access message B repetitions) to the UE. In the illustrated example, uplink 410 may include M1 instances of PRACH repetitions 415 and M2 instances of PUSCH repetitions 420. Downlink 405 may include N instances of a message B 440 (e.g., message B 440-*a*, message B 440-*b*, etc.). In some cases, M1 equals N, or M1 has a different value than N. In some cases, M2 equals N, or M2 has a different value than N. In some cases, M1 equals M2, or M1 has a different value than M2. As shown, each instance of message B 440 may include a physical downlink control channel (PDCCH) or a physical downlink shared channel (PDSCH), or both. In some cases, downlink 405 may include a set of PDCCH repetitions followed by a set of PDSCH repetitions.

In some examples, the base station may transmit, to the UE, a configuration message that indicates configuration information for a random access procedure (e.g., a 2-step random access procedure). In some cases, the configuration message may indicate a repetition number (e.g., the value M1, or value M2, or value N, or any combination thereof) to the UE. In some cases, the configuration information may indicate a frequency hopping configuration for the M1 instances of PRACH repetitions 415, or a frequency hopping configuration for the M2 instances of PUSCH repetitions 420, or both. In some cases, the configuration message may indicate a pattern associated with the M1 instances of PRACH repetitions 415, or a pattern associated with the M2 instances of PUSCH repetitions 420, or both. In some cases, the pattern may be configured by system information block (e.g., SIB1) or radio resource control (RRC, dedicated RRC, etc.). In some cases, the pattern may indicate one or more time gaps associated with the M1 instances of PRACH repetitions 415, or M2 instances of PUSCH repetitions 420, or both. In some cases, the indicated time gaps may include intra gap 425, inner gap 430, and intra gap 435. As shown, intra gap 425 may indicate a time gap between a first instance of the PRACH repetitions 415 and a second instance of the PRACH repetitions 415. As shown, inner gap 430 may indicate a time gap between a last instance of the PRACH repetitions 415 and a first instance of the PUSCH repetitions 420. As shown, intra gap 425 may indicate a time gap between a first instance of the PUSCH repetitions 420 and a second instance of the PUSCH repetitions 420. In some cases, the configuration information may indicate an offset 445 for a random access response (RAR) window 450.

As shown, the UE may initiate transmission of PRACH repetitions 415. Accordingly, the UE initiating transmission of PARCH repetitions may include the UE generating a set of M1 PRACH repetitions, transmitting a first instance of the PRACH repetitions, transmitting a second instance of the PRACH repetitions, and so on.

In some examples, the base station may detect at least one instance of the PRACH repetitions transmitted by the UE. In some cases, the base station may receive one or more instances of the PRACH repetitions.

In some examples, the base station may initiate transmission of message B repetitions 440. In some cases, the base station may initiate transmission of message B repetitions 440 based on the base station detecting at least one instance of a PRACH repetition 415, or at least one instance of a PUSCH repetition 420, or at least one instance of a PRACH repetition 415 and at least one instance of a PUSCH repetition 420. In some cases, the message B repetitions 440 may include a physical downlink control channel (PDCCH) or a physical downlink shared channel (PDSCH), or both. Accordingly, the base station initiating transmission of message B repetitions 440 may include the base station generating a message B (e.g., at least one PDCCH and at least one PDSCH), transmitting a first instance of the message B repetitions 440, transmitting a second instance of the message B repetitions 440, and so on.

In some examples, the UE may stop transmitting the PRACH repetitions 415. In some cases, the UE may stop transmitting the PRACH repetitions 415 based on the UE transmitting each instance of a set of the M1 PRACH repetitions 415 indicated by the configuration information. For example, the configuration information may indicate the UE is to transmit a set of 15 PRACH repetitions 415. Accordingly, UE 115-*b* may stop transmitting the PRACH repetitions after transmitting all 15 instances of the PRACH repetitions 415.

In some examples, the UE may initiate transmission of a set of PUSCH repetitions 420 (e.g., continue transmission of message A repetitions). Accordingly, the UE transmitting a set of PUSCH repetitions may include the UE generating a set of M2 PUSCH repetitions, transmitting a first instance of the PUSCH repetitions 415, transmitting a second instance of the PUSCH repetitions 415, and so on.

In some examples, the UE may monitor for an instance of the message B repetitions 440 from the base station. In some cases, the UE may initiate the monitoring for the message B repetitions 440 before transmitting a last instance of the PUSCH repetitions 420. In some cases, the UE may initiate the monitoring for message B repetitions 440 after transmitting at least a first instance of the PUSCH repetitions 420 (e.g., zero time offset). In some cases, the UE may initiate the monitoring for the message B repetitions 440 after some time offset (e.g., a fixed offset or configured offset). In some cases, the offset may be based off of when the UE has transmitted at least one instance of the message A repetitions 415 and at least one instance of the PUSCH repetitions 420 to the base station.

In some examples, the base station may detect at least one instance of the PUSCH repetitions 420 transmitted by the UE. In some cases, the base station may receive one or more instances of the PUSCH repetitions 420 that the UE begins to transmit.

In some examples, the UE may detect at least one instance of the message B repetitions (e.g., at least one PDCCH and at least one PDSCH) transmitted by the base station. In some cases, the UE may receive one or more instances of message B repetitions 440 that the base station transmit based on the UE detecting at least one instance of the message B repetitions 440 transmitted by the base station.

In some examples, the UE may stop monitoring for message B repetitions 440 from the base station based on the UE receiving at least one message B PDCCH and at least one message B PDSCH from the base station (e.g., random access response (RAR)). In some cases, the base station may continue transmitting message B repetitions 440 after the UE stops monitoring for the message B repetitions transmitted by the base station.

In some examples, the UE may stop transmitting PUSCH repetitions 420. In some cases, the UE may stop transmitting PUSCH repetitions 420 based on the UE receiving at least one instance of the message B repetitions 440 from the base station.

In some cases, the UE may stop transmitting PUSCH repetitions 420 when there are remaining instances of the PUSCH repetitions 420 to be transmitted. For example, the configuration information may indicate the UE is to transmit a set of 14 PUSCH repetitions 420. However, the UE may stop transmitting the PUSCH repetitions after transmitting 9 of the 14 PUSCH repetitions 420 (e.g., based on the UE receiving at least one instance of the message B repetitions 440 from the base station). In some examples, the base station may stop transmitting instances of the message B repetitions 440 based on the base station receiving the feedback sent by the UE.

Figure 5:
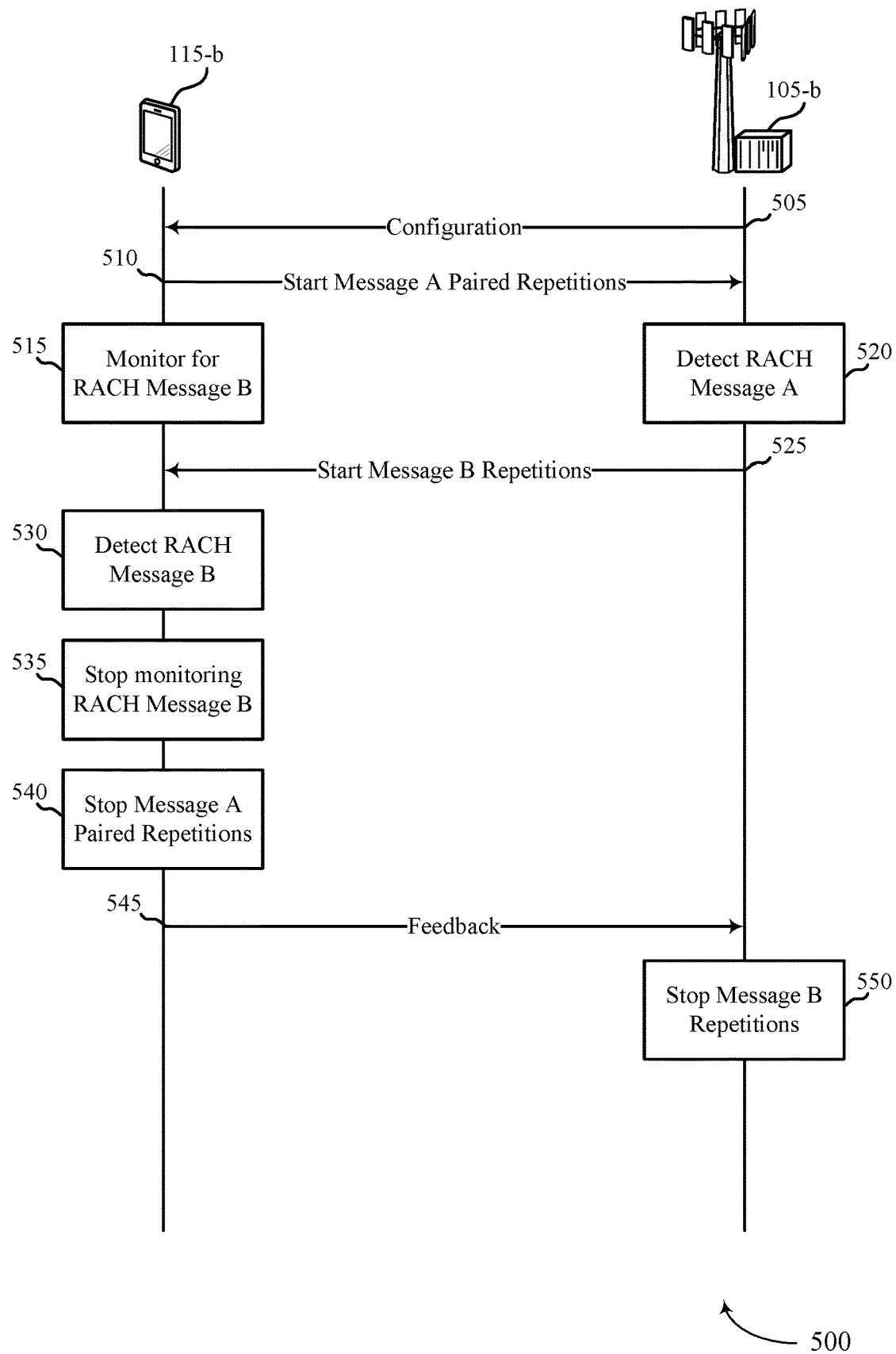
FIG. 5 illustrates an example of a process flow that supports channel repetitions for 2-step RACH procedure in accordance with aspects of the present disclosure.

FIG. 5 illustrates an example of a process flow 500 that supports channel repetitions for 2-step RACH procedure in accordance with aspects of the present disclosure. In some examples, process flow 500 may implement aspects of wireless communication system 100.

Base station 105-*a* may be an example of a base station 105 of FIG. 1 or FIG. 2. UE 115-*b* may be an example of a UE 115 of FIG. 1 or FIG. 2.

In some examples, UE 115-*b* may perform random access procedures for establishing communications between UE 115-*b* and base station 105-*b*. The random access procedure may involve a series of handshake messages between UE 115-*b* and base station 105-*b*. In some cases, UE 115-*b* and base station 105-*b* may improve the throughput associated with the random access procedure based on channel repetitions for 2-step random access procedures. In some cases, the 2-step random access procedure may include UE 115-*b* transmitting a message A (e.g., 2-step random access message A) to base station 105-*b*, and base station 105-*b* transmitting a message B (e.g., 2-step random access message B) to UE 115-*b*.

At 505, base station 105-*b* may transmit, to UE 115-*b*, a configuration message that indicates configuration information for a random access procedure (e.g., a 2-step random access procedure). In some cases, the configuration message may be transmitted via a radio resource control message or a synchronization signal block message, or both.

At 510, UE 115-*b* may initiate transmission of message A paired repetitions. In some cases, the message A paired repetitions may include a physical random access channel (PRACH) paired with a physical uplink shared channel (PUSCH). Accordingly, UE 115-*b* initiating transmission of message A paired repetitions may include UE 115-*b* generating a PRACH/PUSCH pair, transmitting a first instance of the PRACH/PUSCH pair, transmitting a second instance of the PRACH/PUSCH pair, and so on.

At 515, UE 115-*b* may monitor for a message B from base station 105-*b*. In some cases, UE 115-*b* may initiate the monitoring for the message B before transmitting a last instance of the PRACH/PUSCH pairs. In some cases, UE 115-*b* may initiate the monitoring for the message B after transmitting a first instance of the PRACH/PUSCH pairs (e.g., zero time offset). In some cases, UE 115-*b* may initiate the monitoring for the message B before transmitting a second instance of the PRACH/PUSCH pairs. In some cases, UE 115-*b* may initiate the monitoring for the message B after some time offset (e.g., a fixed offset or configured offset). In some cases, the time offset may be based on an indicated time or determined time when the first instance of the PRACH/PUSCH pairs is transmitted.

At 520, base station 105-*b* may detect at least one message A (e.g., a PRACH/PUSCH pair) transmitted by UE 115-*b*. In some cases, base station 105-*b* may receive one or more instances of the PRACH/PUSCH pairs that UE 115-*b* begins to transmit at 510. In some cases, base station 105-*b* may stop detecting message A repetitions from UE 115-*b* based on base station 105-*b* receiving at least one message A PRACH and at least one message A PUSCH from UE 115-*b*. In some cases, UE 115-*b* may continue transmitting message A paired repetitions after base station 105-*b* stops detecting the message A paired repetitions from UE 115-*b*.

At 525, base station 105-*b* may initiate transmission of message B repetitions. In some cases, base station 105-*b* may initiate transmission of message B repetitions based on base station 105-*b* detecting at least one message A at 520. In some cases, the message B repetitions may include a physical downlink control channel (PDCCH) or a physical downlink shared channel (PDSCH), or both. Accordingly, base station 105-*b* initiating transmission of message B repetitions may include base station 105-*b* generating a message B (e.g., at least one PDCCH and at least one PDSCH), transmitting a first instance of the message B, transmitting a second instance of the message B, and so on.

At 530, UE 115-*b* may detect at least one message B (e.g., at least one PDCCH and at least one PDSCH) transmitted by base station 105-*b*. In some cases, UE 115-*b* may receive one or more instances of message B that base station 105-*b* begins to transmit at 525 based on UE 115-*b* detecting at least one message B transmission from base station 105-*b*.

At 535, UE 115-*b* may stop monitoring for message B repetitions from base station 105-*b* based on UE 115-*b* receiving at least one message B PDCCH and at least one message B PDSCH from base station 105-*b* (e.g., random access response (RAR)). In some cases, base station 105-*b* may continue transmitting message B repetitions after UE 115-*b* stops monitoring for the message B repetitions transmitted by base station 105-*b*.

At 540, UE 115-*b* may stop transmitting message A paired repetitions. In some cases, UE 115-*b* may stop transmitting message A paired repetitions based on UE 115-*b* receiving at least one instance of the message B repetitions from base station 105-*b*. In some cases, UE 115-*b* may stop transmitting message A paired repetitions when there are remaining instances of message A paired repetitions to be transmitted. For example, the configuration information from 505 may indicate UE 115-*b* is to transmit a set of 10 message A paired repetitions. However, UE 115-*b* may stop transmitting the message A paired repetitions after transmitting 6 of the 10 message A paired repetitions (e.g., based on UE 115-*b* receiving at least one instance of the message B repetitions from base station 105-*b*).

At 545, UE 115-*b* may transmit feedback to base station 105-*b*. In some cases, UE 115-*b* may transmit the feedback after contention resolution. In some cases, UE 115-*b* may transmit an acknowledgement (ACK) message (e.g., hybrid automatic repeat request (HARQ) ACK) to base station 105-*b* as feedback.

At 550, base station 105-*b* may stop transmitting instances of the message B repetitions. In some cases, base station 105-*b* may stop transmitting instances of the message B repetitions based on base station 105-*b* receiving the feedback sent by UE 115-*b* at 545.

Figure 6:
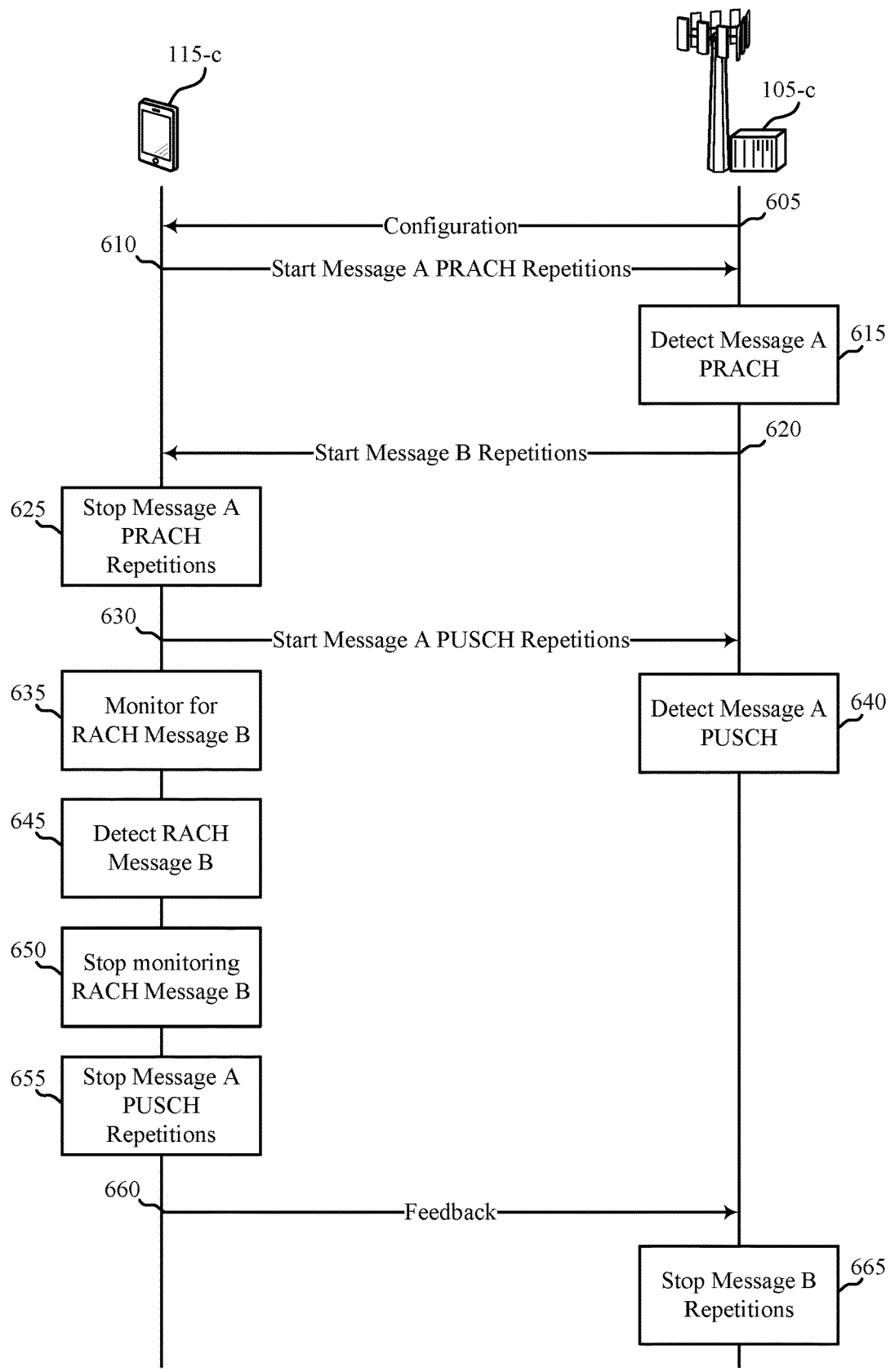
FIG. 6 illustrates an example of a process flow that supports channel repetitions for 2-step RACH procedure in accordance with aspects of the present disclosure.

FIG. 6 illustrates an example of a process flow 600 that supports channel repetitions for 2-step RACH procedure in accordance with aspects of the present disclosure. In some examples, process flow 600 may implement aspects of wireless communication system 100.

Base station 105-*c* may be an example of a base station 105 of FIG. 1, FIG. 2, or FIG. 5. UE 115-*c* may be an example of a UE 115 of FIG. 1, FIG. 2, or FIG. 5.

At 605, base station 105-*c* may transmit, to UE 115-*c*, a configuration message that indicates configuration information for a random access procedure (e.g., a 2-step random access procedure). In some cases, the configuration message may be transmitted via a radio resource control message or a synchronization signal block message, or both.

At 610, UE 115-*c* may initiate transmission of message A repetitions. In some cases, the message A repetitions may include a set of physical random access channel (PRACH) repetitions followed by a set of physical uplink shared channel (PUSCH) repetitions. Accordingly, UE 115-*c* initiating transmission of message A repetitions may include UE 115-*c* generating a set of PRACH repetitions, transmitting a first instance of the PRACH repetitions, transmitting a second instance of the PRACH repetitions, and so on.

At 615, base station 105-*c* may detect at least one instance of the PRACH repetitions transmitted by UE 115-*c*. In some cases, base station 105-*c* may receive one or more instances of the PRACH repetitions that UE 115-*c* begins to transmit at 610.

At 620, base station 105-*c* may initiate transmission of message B repetitions. In some cases, base station 105-*c* may initiate transmission of message B repetitions based on base station 105-*c* detecting at least one instance of a message A PRACH at 615. In some cases, the message B repetitions may include a physical downlink control channel (PDCCH) or a physical downlink shared channel (PDSCH), or both. Accordingly, base station 105-*c* initiating transmission of message B repetitions may include base station 105-*c* generating a message B (e.g., at least one PDCCH and at least one PDSCH), transmitting a first instance of the message B, transmitting a second instance of the message B, and so on.

At 625, UE 115-*c* may stop transmitting the PRACH repetitions. In some cases, UE 115-*c* may stop transmitting the PRACH repetitions based on UE 115-*c* transmitting each instance of a set of PRACH repetitions indicated by the configuration information. For example, the configuration information from 605 may indicate UE 115-*c* is to transmit a set of 10 PRACH repetitions. Accordingly, UE 115-*b* may stop transmitting the PRACH repetitions after transmitting all 10 instances of the PRACH repetitions.

At 630, UE 115-*c* may initiate transmission of a set of PUSCH repetitions (e.g., continue transmission of message A repetitions). Accordingly, UE 115-*c* continuing transmission of message A repetitions may include UE 115-*c* generating a set of PUSCH repetitions, transmitting a first instance of the PUSCH repetitions, transmitting a second instance of the PUSCH repetitions, and so on.

At 635, UE 115-*c* may monitor for a message B from base station 105-*c*. In some cases, UE 115-*c* may initiate the monitoring for the message B before transmitting a last instance of the PUSCH repetitions. In some cases, UE 115-*c* may initiate the monitoring for message B after transmitting at least a first instance of the PUSCH repetitions (e.g., zero time offset). In some cases, UE 115-*c* may initiate the monitoring for the message B after some time offset (e.g., a fixed offset or configured offset). In some cases, the offset may be based off of when UE 115-*c* has transmitted at least one message A PRACH and at least one message A PUSCH to base station 105-*c*.

At 640, base station 105-*c* may detect at least one instance of the PUSCH repetitions transmitted by UE 115-*c*. In some cases, base station 105-c may receive one or more instances of the PUSCH repetitions that UE 115-c begins to transmit at 630.

At 645, UE 115-c may detect at least one message B (e.g., at least one PDCCH and at least one PDSCH) transmitted by base station 105-c. In some cases, UE 115-c may receive one or more instances of message B that base station 105-c begins to transmit at 620 based on UE 115-c detecting at least one message B transmission from base station 105-c.

At 650, UE 115-c may stop monitoring for message B repetitions from base station 105-c based on UE 115-c receiving at least one message B PDCCH and at least one message B PDSCH from base station 105-c (e.g., random access response (RAR)). In some cases, UE 115-c receiving at least one message B PDCCH and at least one message B PDSCH from base station 105-c may include UE 115-c determining that UE 115-c receives the at least one message B PDCCH and the at least one message B PDSCH without errors (e.g., based on error detection, error correction, CRC, FEC, etc.). In some cases, base station 105-c may continue transmitting message B repetitions after UE 115-c stops monitoring for the message B repetitions transmitted by base station 105-c.

At 655, UE 115-c may stop transmitting message A PUSCH repetitions. In some cases, UE 115-c may stop transmitting PUSCH repetitions based on UE 115-c receiving at least one instance of the message B repetitions from base station 105-c.

In some cases, UE 115-c may stop transmitting PUSCH repetitions when there are remaining instances of PUSCH repetitions to be transmitted. For example, the configuration information from 605 may indicate UE 115-c is to transmit a set of 8 PUSCH repetitions. However, UE 115-c may stop transmitting the PUSCH repetitions after transmitting 4 of the 8 PUSCH repetitions (e.g., based on UE 115-c receiving at least one instance of the message B repetitions from base station 105-c).

At 660, UE 115-c may transmit feedback to base station 105-c. In some cases, UE 115-c may transmit the feedback after contention resolution. In some cases, UE 115-c may transmit an acknowledgement (ACK) message (e.g., hybrid automatic repeat request (HARQ) ACK) to base station 105-c as feedback.

At 665, base station 105-c may stop transmitting instances of the message B repetitions. In some cases, base station 105-c may stop transmitting instances of the message B repetitions based on base station 105-c receiving the feedback sent by UE 115-c at 645.

Figure 7:
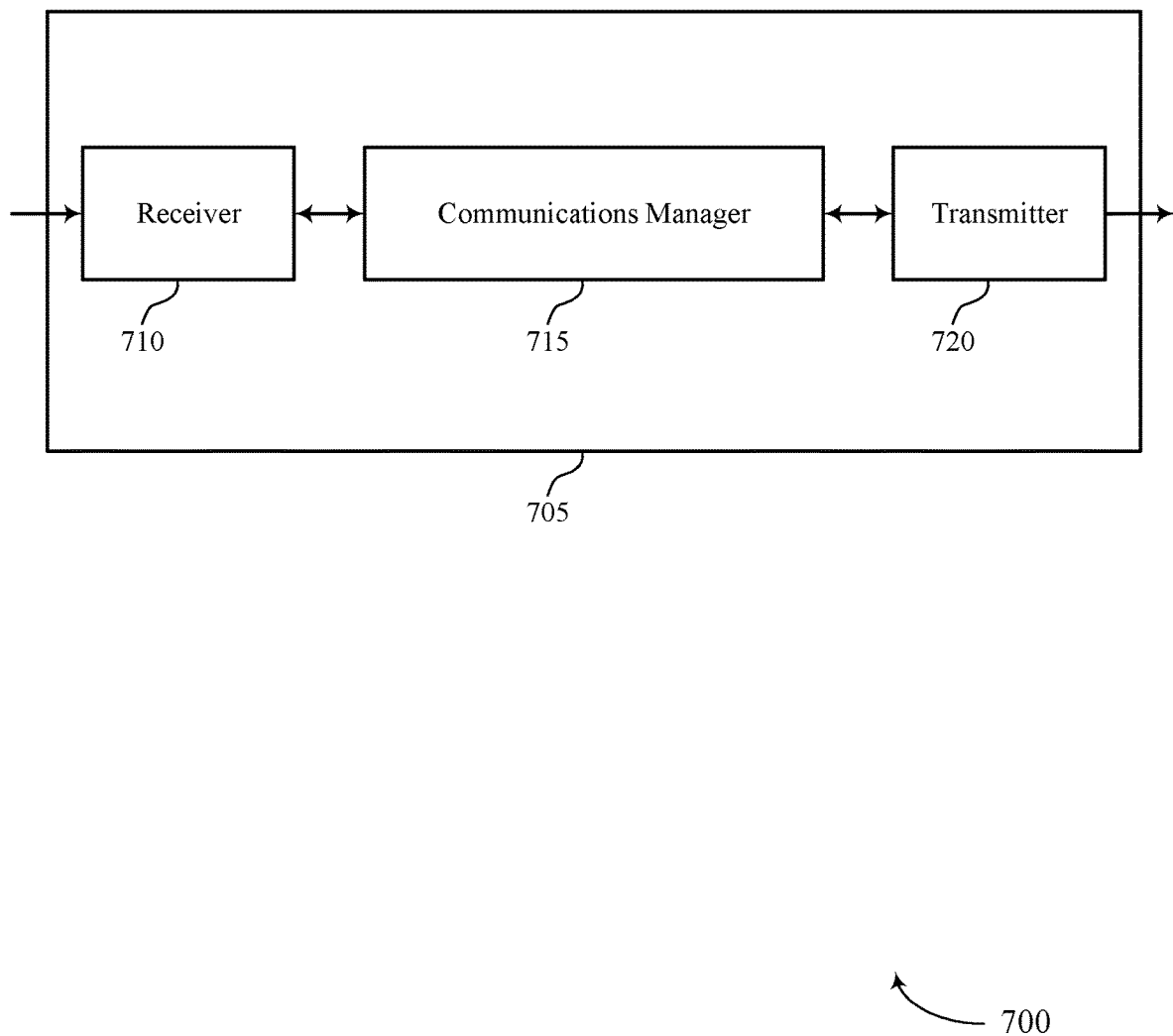
FIGS. 7 and 8 show block diagrams of devices that support channel repetitions for 2-step RACH procedure in accordance with aspects of the present disclosure.

FIG. 7 shows a block diagram 700 of a device 705 that supports channel repetitions for 2-step RACH procedure in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to channel repetitions for 2-step RACH procedure, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a configuration message that indicates configuration information for a random access procedure, determine a repetition pattern associated with a first message of the random access procedure based on the configuration information, and transmit, to the base station, multiple instances of the first message based on the repetition pattern. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
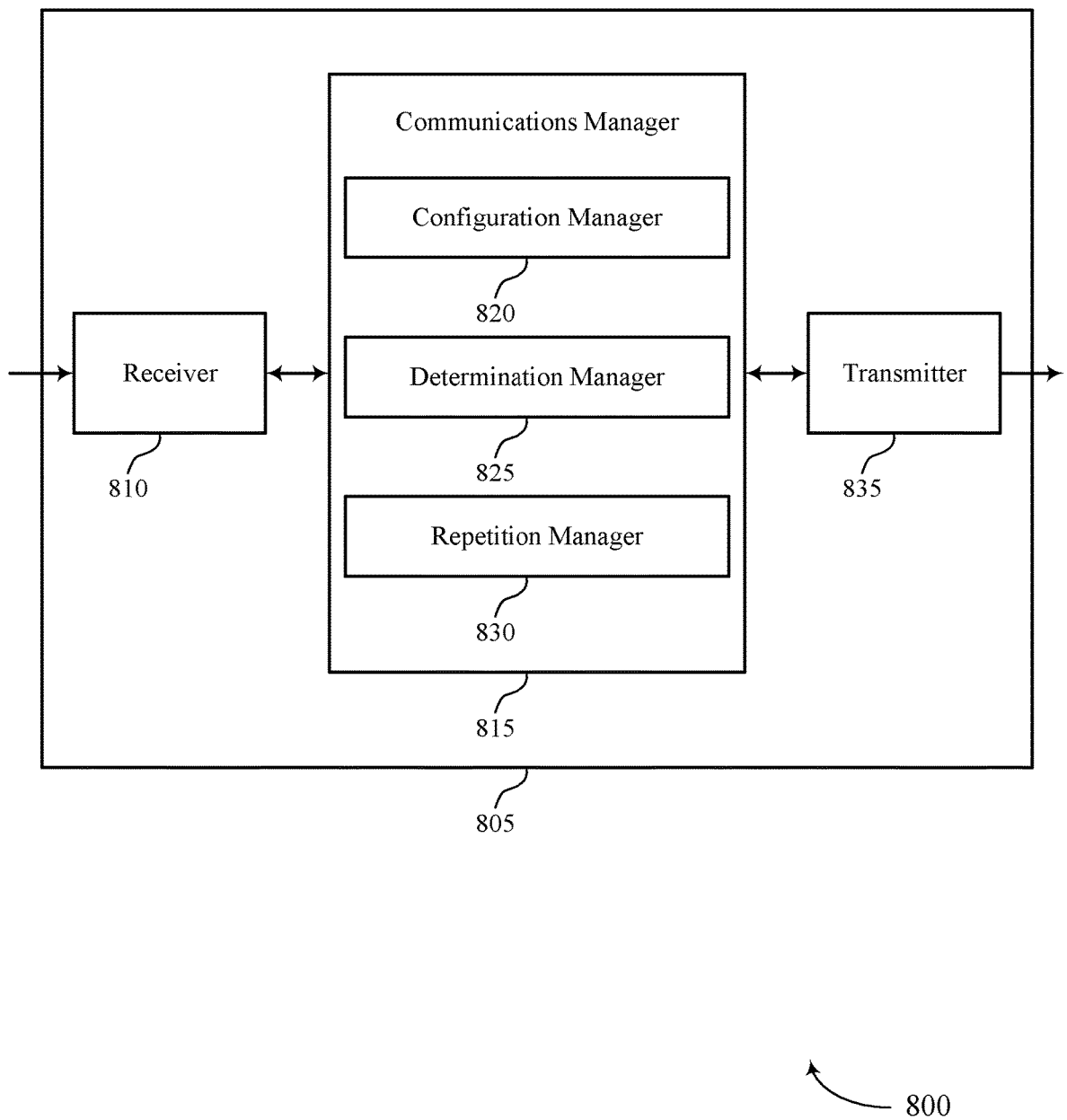

FIG. 8 shows a block diagram 800 of a device 805 that supports channel repetitions for 2-step RACH procedure in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to channel repetitions for 2-step RACH procedure, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration manager 820, a determination manager 825, and a repetition manager 830. The communications manager 815 may be an example of aspects of the communications manager 1010 described herein.

The configuration manager 820 may receive, from a base station, a configuration message that indicates configuration information for a random access procedure. The determination manager 825 may determine a repetition pattern associated with a first message of the random access procedure based on the configuration information. The repetition manager 830 may transmit, to the base station, multiple instances of the first message based on the repetition pattern.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
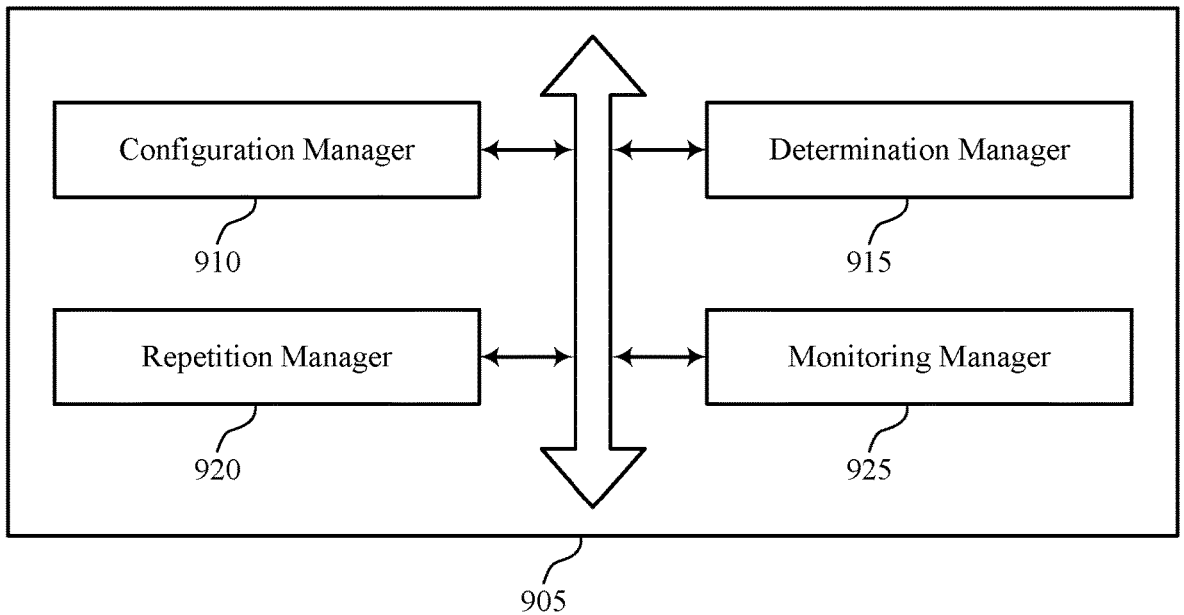
FIG. 9 shows a block diagram of a communications manager that supports channel repetitions for 2-step RACH procedure in accordance with aspects of the present disclosure.

FIG. 9 shows a block diagram 900 of a communications manager 905 that supports channel repetitions for 2-step RACH procedure in accordance with aspects of the present disclosure. The communications manager 905 may be an example of aspects of a communications manager 715, a communications manager 815, or a communications manager 1010 described herein. The communications manager 905 may include a configuration manager 910, a determination manager 915, a repetition manager 920, and a monitoring manager 925. Each of these modules may communicate, directly or indirectly, with one another (e.g., via one or more buses).

The configuration manager 910 may receive, from a base station, a configuration message that indicates configuration information for a random access procedure. In some examples, the configuration manager 910 may receive the configuration information in a radio resource control message or a synchronization signal block message, or both. In some cases, the random access procedure includes a two-step random access procedure.

The determination manager 915 may determine a repetition pattern associated with a first message of the random access procedure based on the configuration information. In some examples, the determination manager 915 may determine that the repetition pattern indicates repeated transmissions of a pair of physical random access channel and physical uplink shared channel. The repetition manager 920 may transmit, to the base station, multiple instances of the first message based on the repetition pattern.

In some examples, the determination manager 915 may determine that the repetition pattern indicates repeated transmissions of a physical random access channel followed by repeated transmissions of a physical uplink shared channel subsequent to a last instance of the repeated transmissions of the physical random access channel. In some examples, the determination manager 915 may determine a timing configuration of time resources associated with the transmitting of the multiple instances of the first message based on the configuration information.

In some examples, the determination manager 915 may determine, based on the configuration information, a time gap configuration of the multiple instances of the first message indicating a spacing between a physical random access channel and a physical uplink shared channel, or a spacing between a first instance of a physical random access channel and a second instance of a physical random access channel, or a spacing between a first instance of a physical uplink shared channel and a second instance of a physical uplink shared channel, or a spacing between a first pair of physical random access channel and physical uplink shared channel and a second pair of physical random access channel and physical uplink shared channel, or any combination thereof.

In some examples, the determination manager 915 may determine, based on the configuration information, a number of transmissions of a physical random access channel to be included in the transmitting of the multiple instances of the first message. In some examples, the determination manager 915 may determine, based on the configuration information, a number of transmissions of a physical uplink shared channel to be included in the transmitting of the multiple instances of the first message.

In some cases, the number of transmissions of the physical random access channel is based on a channel condition associated with the physical random access channel or on a reference signal received power (RSRP) of a synchronization signal block (SSB) associated with the physical random access channel, or both. In some cases, the number of transmissions of the physical uplink shared channel is based on a channel condition associated with the physical uplink shared channel or on a reference signal received power (RSRP) of a synchronization signal block (SSB) associated with the physical uplink shared channel, or both. In some cases, the number of transmissions of the physical random access channel is equal to or different from the number of transmissions of the physical uplink shared channel.

The monitoring manager 925 may monitor for a second message of the random access procedure from the base station based on the configuration information. In some examples, the monitoring manager 925 may detect the second message based on the monitoring. In some examples, the monitoring manager 925 may cease the transmitting of the multiple instances of the first message based on detecting the second message. In some cases, the second message of the random access procedure includes a physical downlink control channel or a physical downlink shared channel, or both.

In some examples, the monitoring manager 925 may cease the monitoring for the second message based on detecting the second message. In some examples, the monitoring manager 925 may initiate the monitoring after transmitting a first instance of the multiple instances of the first message and before transmitting a last instance of the multiple instances of the first message.

Figure 10:
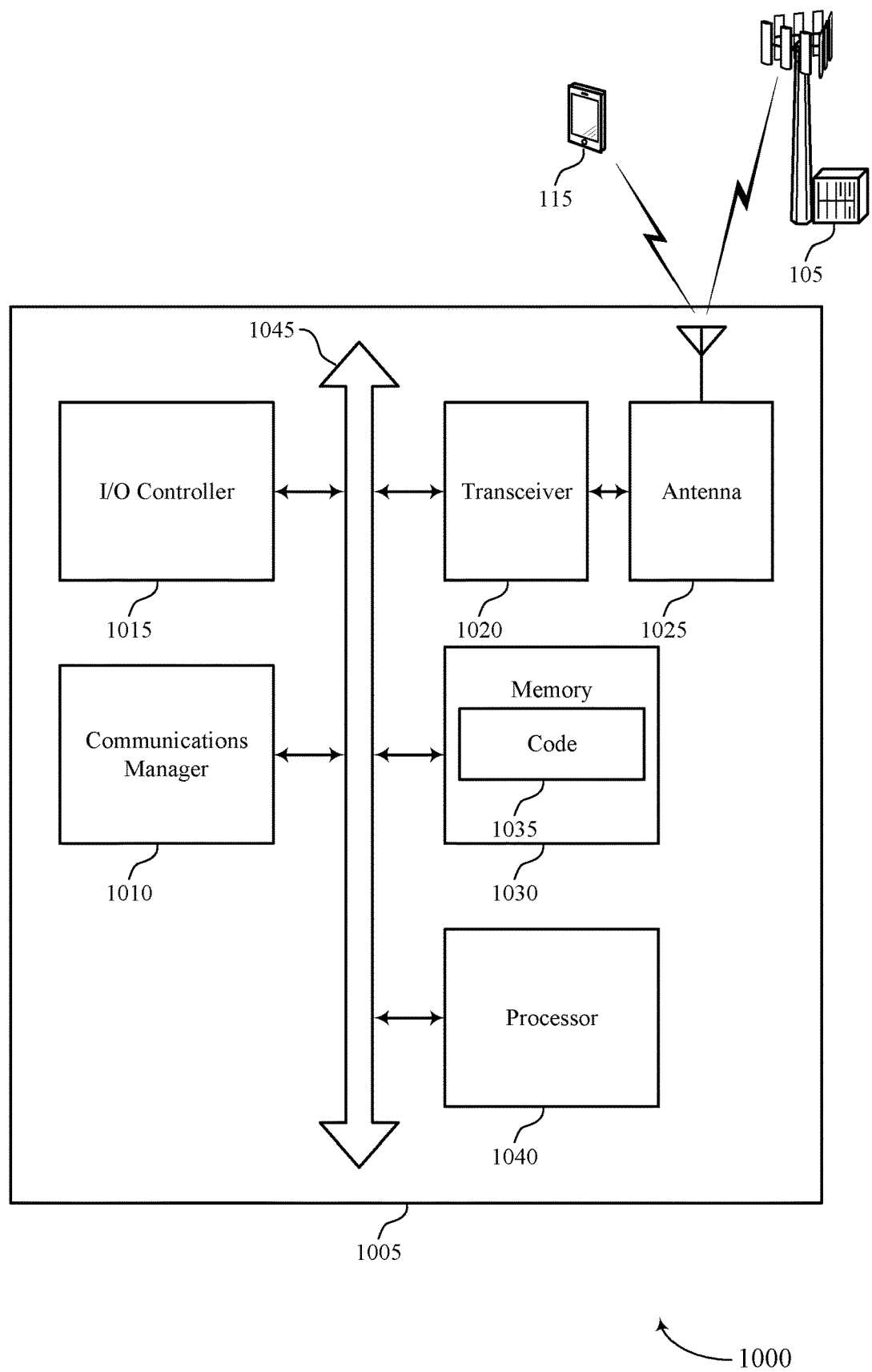
FIG. 10 shows a diagram of a system including a device that supports channel repetitions for 2-step RACH procedure in accordance with aspects of the present disclosure.

FIG. 10 shows a diagram of a system 1000 including a device 1005 that supports channel repetitions for 2-step RACH procedure in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a configuration message that indicates configuration information for a random access procedure, determine a repetition pattern associated with a first message of the random access procedure based on the configuration information, and transmit, to the base station, multiple instances of the first message based on the repetition pattern.

The I/O controller 1015 may manage input and output signals for the device 1005. The I/O controller 1015 may also manage peripherals not integrated into the device 1005.

In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting channel repetitions for 2-step RACH procedure).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
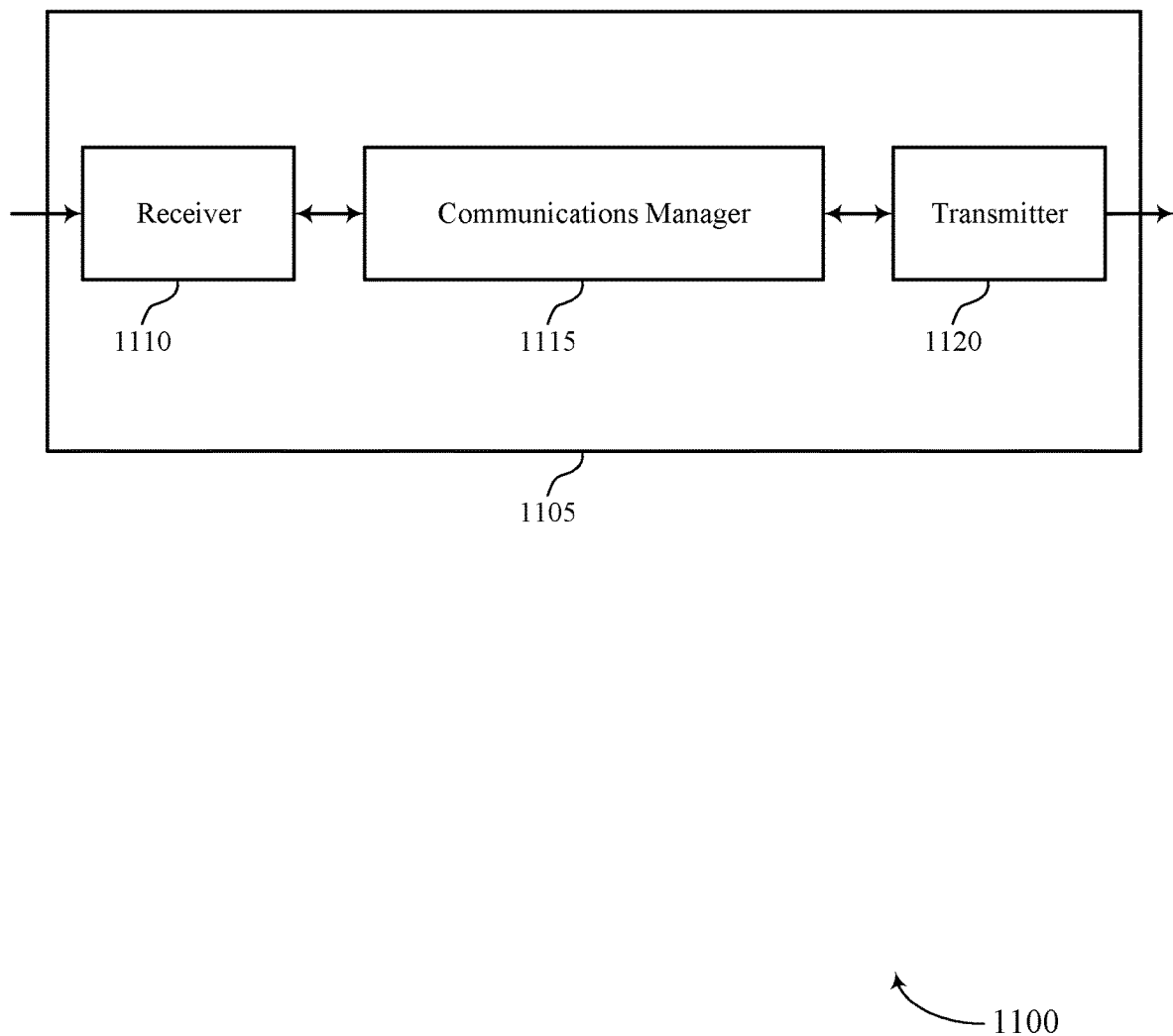
FIGS. 11 and 12 show block diagrams of devices that support channel repetitions for 2-step RACH procedure in accordance with aspects of the present disclosure.

FIG. 11 shows a block diagram 1100 of a device 1105 that supports channel repetitions for 2-step RACH procedure in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to channel repetitions for 2-step RACH procedure, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine configuration information for a random access procedure, the configuration information including a repetition pattern associated with a first message of the random access procedure, transmit, to a UE, a configuration message that indicates the configuration information for the random access procedure, and receive, from the UE, multiple instances of the first message based on the repetition pattern. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
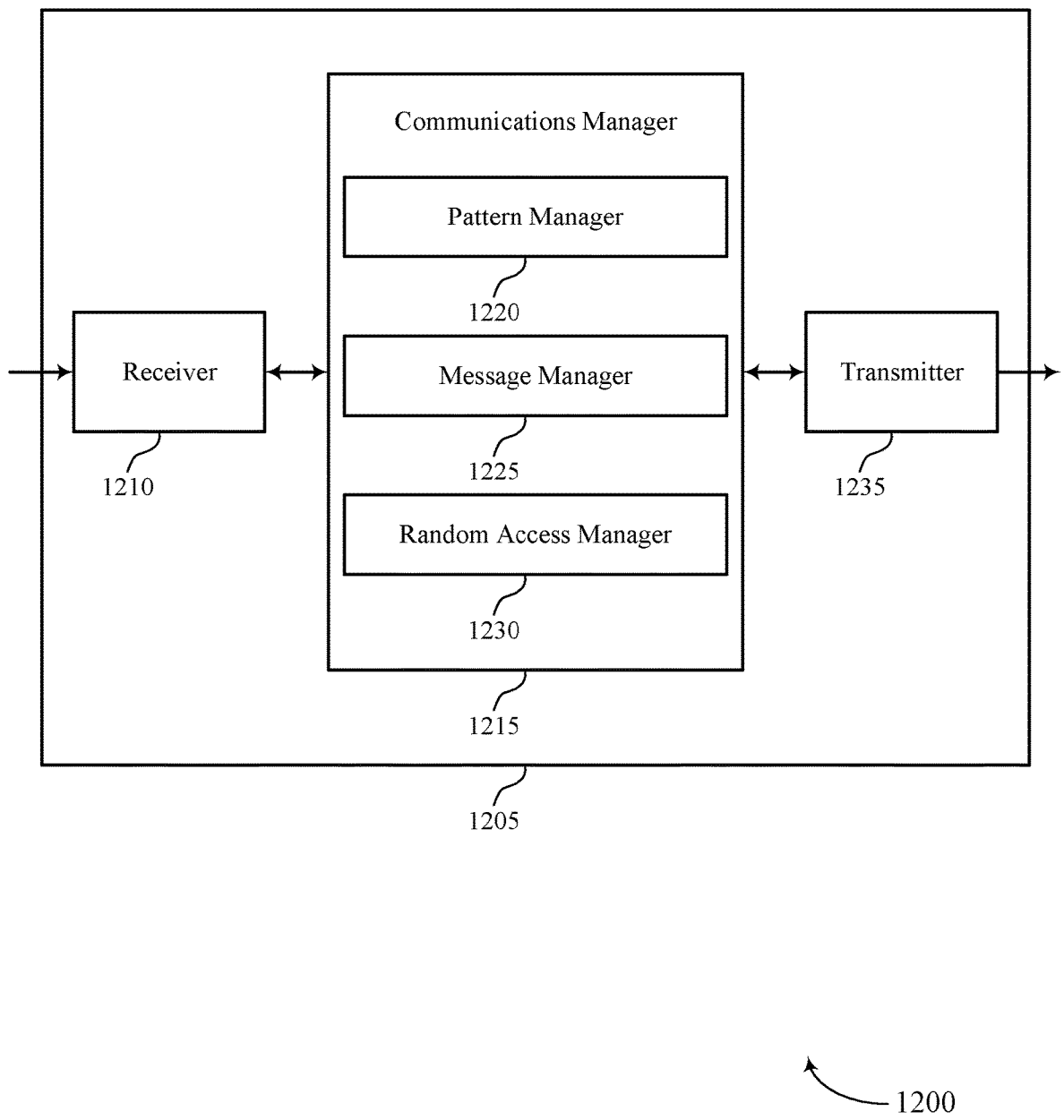

FIG. 12 shows a block diagram 1200 of a device 1205 that supports channel repetitions for 2-step RACH procedure in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to channel repetitions for 2-step RACH procedure, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a pattern manager 1220, a message manager 1225, and a random access manager 1230. The communications manager 1215 may be an example of aspects of the communications manager 1410 described herein.

The pattern manager 1220 may determine configuration information for a random access procedure, the configuration information including a repetition pattern associated with a first message of the random access procedure. The message manager 1225 may transmit, to a UE, a configuration message that indicates the configuration information for the random access procedure. The random access manager 1230 may receive, from the UE, multiple instances of the first message based on the repetition pattern.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
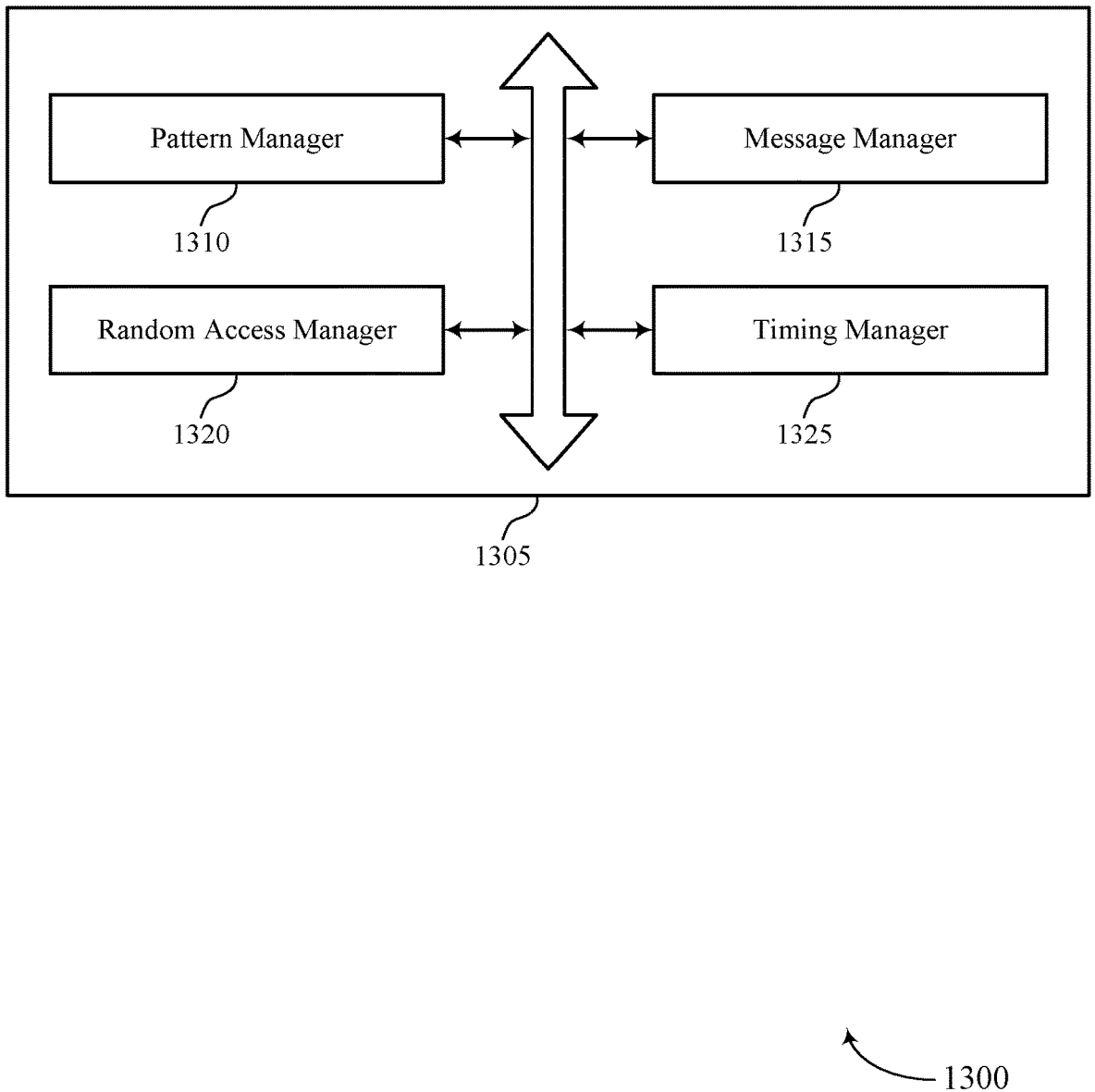
FIG. 13 shows a block diagram of a communications manager that supports channel repetitions for 2-step RACH procedure in accordance with aspects of the present disclosure.

FIG. 13 shows a block diagram 1300 of a communications manager 1305 that supports channel repetitions for 2-step RACH procedure in accordance with aspects of the present disclosure. The communications manager 1305 may be an example of aspects of a communications manager 1115, a communications manager 1215, or a communications manager 1410 described herein. The communications manager 1305 may include a pattern manager 1310, a message manager 1315, a random access manager 1320, and a timing manager 1325. Each of these modules may communicate, directly or indirectly, with one another (e.g., via one or more buses).

The pattern manager 1310 may determine configuration information for a random access procedure, the configuration information including a repetition pattern associated with a first message of the random access procedure. In some examples, the pattern manager 1310 may configure the repetition pattern to indicate repeated transmissions of a pair of physical random access channel and physical uplink shared channel.

In some examples, the pattern manager 1310 may configure the repetition pattern to indicate repeated transmissions of a physical random access channel followed by repeated transmissions of a physical uplink shared channel subsequent to a last instance of the repeated transmissions of the physical random access channel. In some examples, the pattern manager 1310 may configure the configuration information to indicate a number of transmissions of a physical random access channel to be included in the multiple instances of the first message.

In some examples, the pattern manager 1310 may configure the configuration information to indicate a number of transmissions of a physical uplink shared channel to be included in the multiple instances of the first message. In some examples, the pattern manager 1310 may base the number of transmissions of the physical random access channel at least in part on a channel condition associated with the physical random access channel or on a reference signal received power (RSRP) of a synchronization signal block (SSB) associated with the physical random access channel, or both.

In some examples, the pattern manager 1310 may base the number of transmissions of the physical uplink shared channel at least in part on a channel condition associated with the physical uplink shared channel or on a reference signal received power (RSRP) of a synchronization signal block (SSB) associated with the physical uplink shared channel, or both. In some examples, the pattern manager 1310 may set the number of transmissions of the physical random access channel to be equal to or different from the number of transmissions of the physical uplink shared channel.

The message manager 1315 may transmit, to a UE, a configuration message that indicates the configuration information for the random access procedure. In some examples, the message manager 1315 may transmit, to the UE, a second message of the random access procedure based on a first instance of the multiple instances of the first message that is detected by the base station. In some cases, the second message of the random access procedure includes a physical downlink control channel or a physical downlink shared channel, or both.

In some examples, the message manager 1315 may discard any subsequent instances of the multiple instances of the first message after the detecting the first instance of the multiple instances of the first message. In some examples, the message manager 1315 may detect at least one instance of a physical random access channel and at least one instance of a physical uplink shared channel from the UE.

In some examples, the message manager 1315 may transmit the configuration information in a radio resource control message or a synchronization signal block message, or both.

The random access manager 1320 may receive, from the UE, multiple instances of the first message based on the repetition pattern. In some cases, the random access procedure includes a two-step random access procedure.

The timing manager 1325 may configure the configuration information to include a timing configuration of time resources associated with the multiple instances of the first message. In some examples, the timing manager 1325 may configure the configuration information to include a time gap configuration of the multiple instances of the first message, the time gap configuration indicating a spacing between a physical random access channel and a physical uplink shared channel, or a spacing between a first instance of a physical random access channel and a second instance of a physical random access channel, or a spacing between a first instance of a physical uplink shared channel and a second instance of a physical uplink shared channel, or a spacing between a first pair of physical random access channel and physical uplink shared channel and a second pair of physical random access channel and physical uplink shared channel, or any combination thereof.

Figure 14:
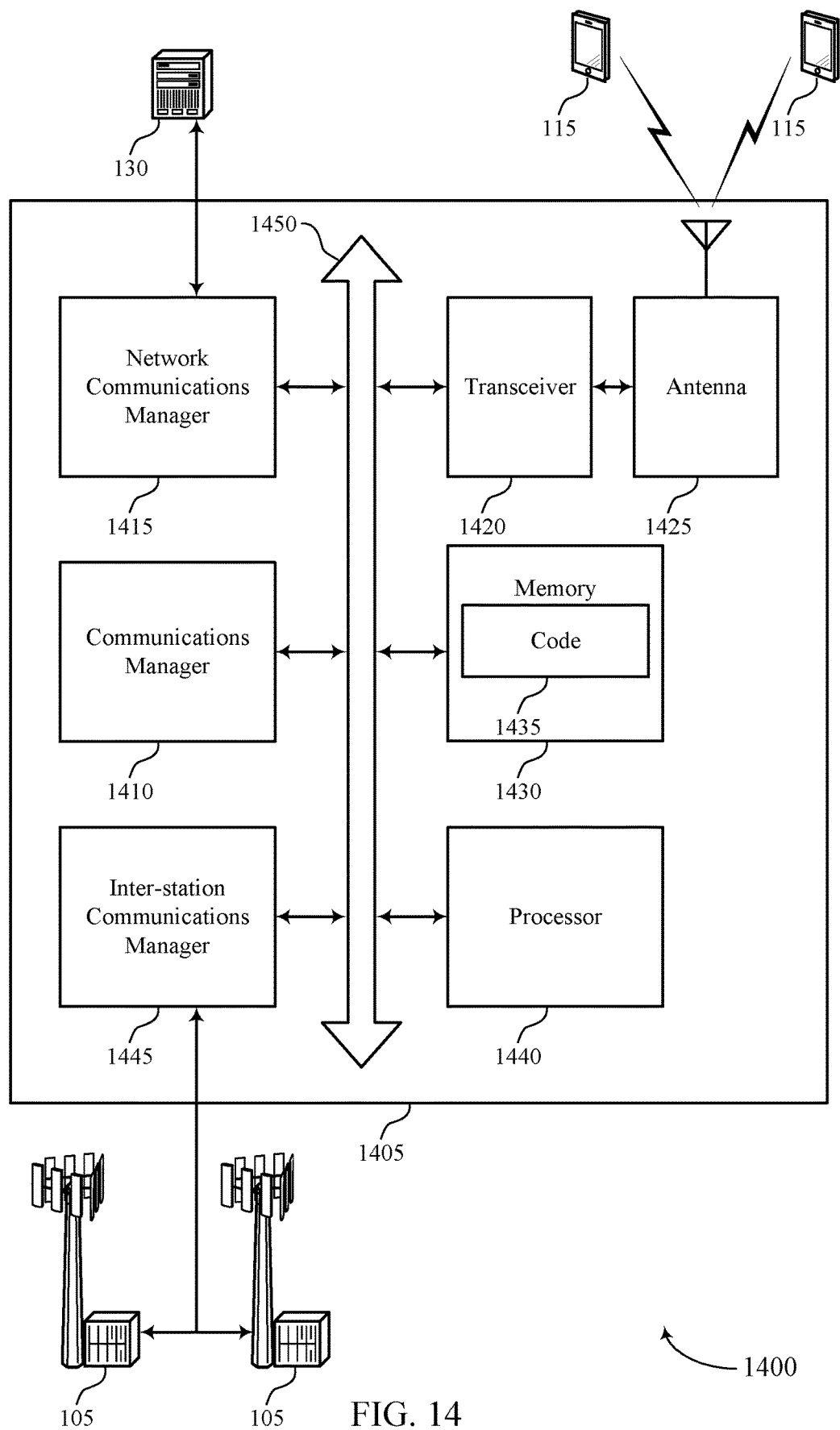
FIG. 14 shows a diagram of a system including a device that supports channel repetitions for 2-step RACH procedure in accordance with aspects of the present disclosure.

FIG. 14 shows a diagram of a system 1400 including a device 1405 that supports channel repetitions for 2-step RACH procedure in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine configuration information for a random access procedure, the configuration information including a repetition pattern associated with a first message of the random access procedure, transmit, to a UE, a configuration message that indicates the configuration information for the random access procedure, and receive, from the UE, multiple instances of the first message based on the repetition pattern.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting channel repetitions for 2-step RACH procedure).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
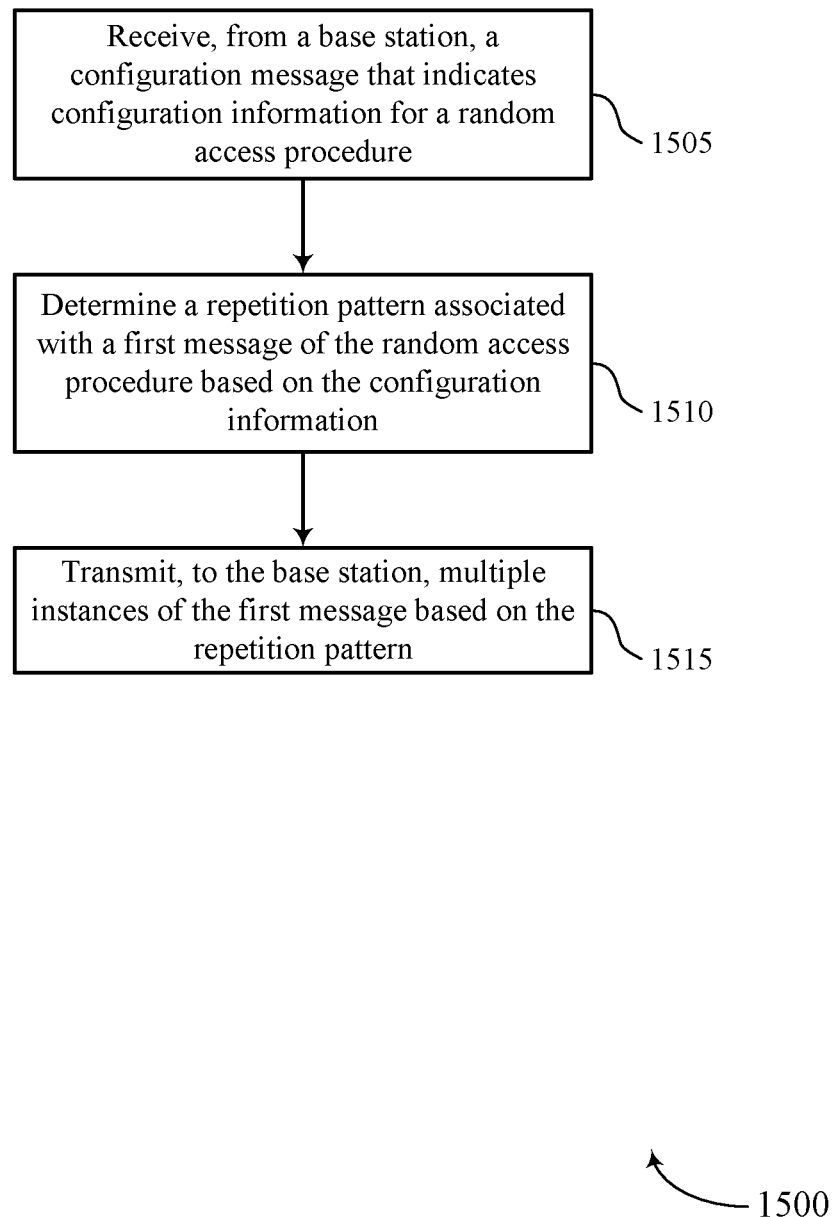
FIGS. 15 through 18 show flowcharts illustrating methods that support channel repetitions for 2-step RACH procedure in accordance with aspects of the present disclosure.

FIG. 15 shows a flowchart illustrating a method 1500 that supports channel repetitions for 2-step RACH procedure in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a configuration message that indicates configuration information for a random access procedure. The operations of 1505 may be performed according to the methods described herein. In some examples, aspects of the operations of 1505 may be performed by a configuration manager as described with reference to FIGS. 7 through 10.

At 1510, the UE may determine a repetition pattern associated with a first message of the random access procedure based on the configuration information. The operations of 1510 may be performed according to the methods described herein. In some examples, aspects of the operations of 1510 may be performed by a determination manager as described with reference to FIGS. 7 through 10.

At 1515, the UE may transmit, to the base station, multiple instances of the first message based on the repetition pattern. The operations of 1515 may be performed according to the methods described herein. In some examples, aspects of the operations of 1515 may be performed by a repetition manager as described with reference to FIGS. 7 through 10.

Figure 16:
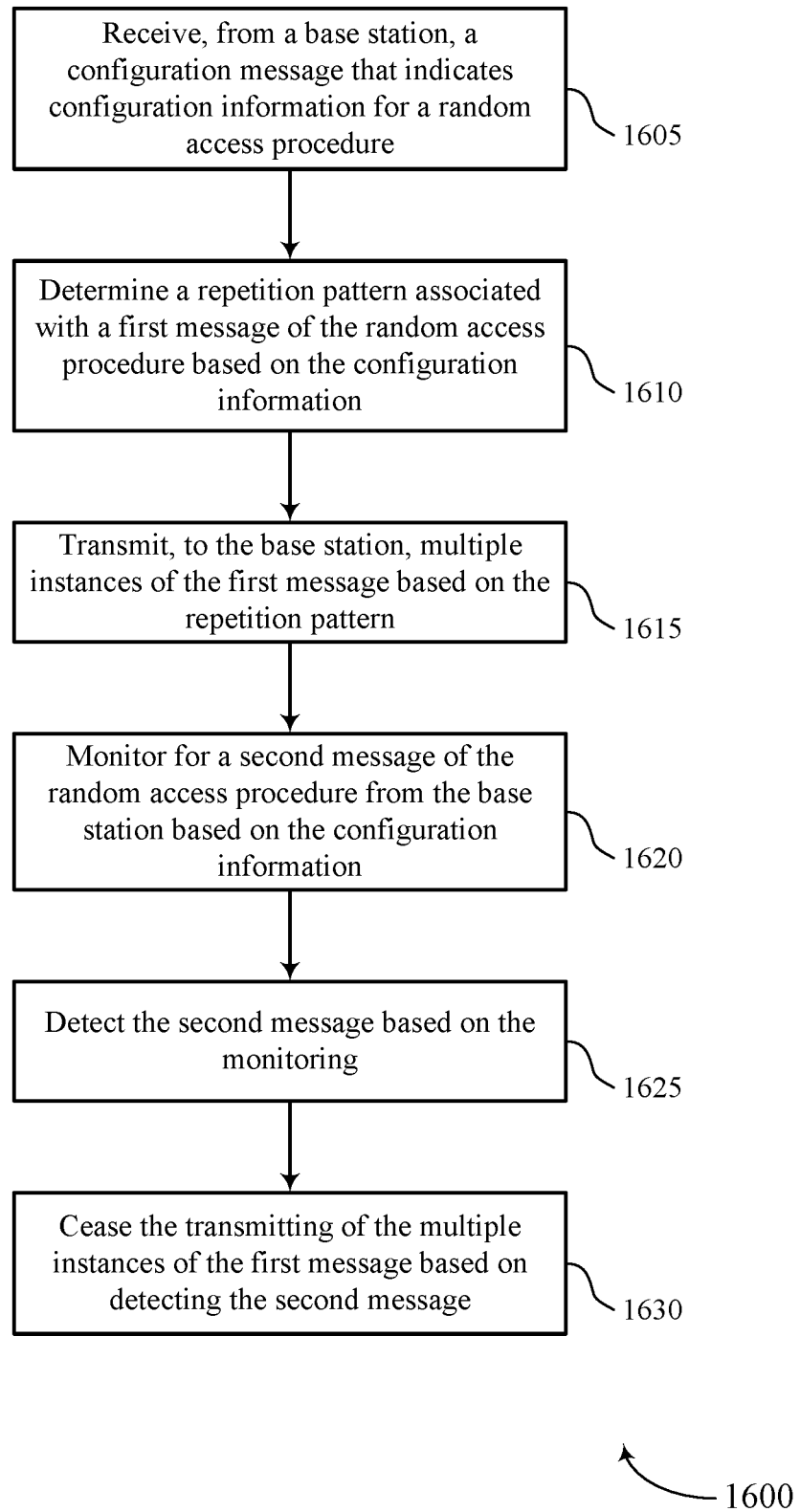

FIG. 16 shows a flowchart illustrating a method 1600 that supports channel repetitions for 2-step RACH procedure in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a configuration message that indicates configuration information for a random access procedure. The operations of 1605 may be performed according to the methods described herein. In some examples, aspects of the operations of 1605 may be performed by a configuration manager as described with reference to FIGS. 7 through 10.

At 1610, the UE may determine a repetition pattern associated with a first message of the random access procedure based on the configuration information. The operations of 1610 may be performed according to the methods described herein. In some examples, aspects of the operations of 1610 may be performed by a determination manager as described with reference to FIGS. 7 through 10.

At 1615, the UE may transmit, to the base station, multiple instances of the first message based on the repetition pattern. The operations of 1615 may be performed according to the methods described herein. In some examples, aspects of the operations of 1615 may be performed by a repetition manager as described with reference to FIGS. 7 through 10.

At 1620, the UE may monitor for a second message of the random access procedure from the base station based on the configuration information. The operations of 1620 may be performed according to the methods described herein. In some examples, aspects of the operations of 1620 may be performed by a monitoring manager as described with reference to FIGS. 7 through 10.

At 1625, the UE may detect the second message based on the monitoring. The operations of 1625 may be performed according to the methods described herein. In some examples, aspects of the operations of 1625 may be performed by a monitoring manager as described with reference to FIGS. 7 through 10.

At 1630, the UE may cease the transmitting of the multiple instances of the first message based on detecting the second message. The operations of 1630 may be performed according to the methods described herein. In some examples, aspects of the operations of 1630 may be performed by a monitoring manager as described with reference to FIGS. 7 through 10.

Figure 17:
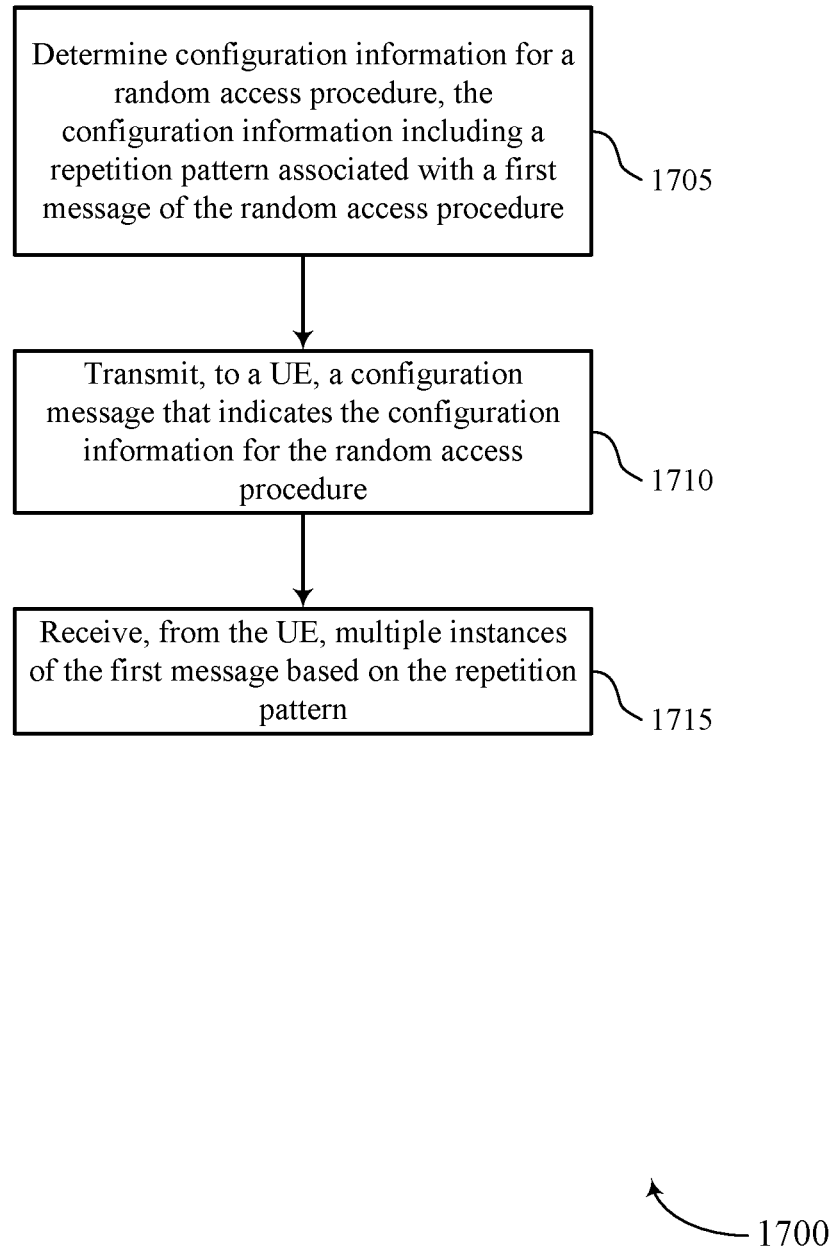

FIG. 17 shows a flowchart illustrating a method 1700 that supports channel repetitions for 2-step RACH procedure in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may determine configuration information for a random access procedure, the configuration information including a repetition pattern associated with a first message of the random access procedure. The operations of 1705 may be performed according to the methods described herein. In some examples, aspects of the operations of 1705 may be performed by a pattern manager as described with reference to FIGS. 11 through 14.

At 1710, the base station may transmit, to a UE, a configuration message that indicates the configuration information for the random access procedure. The operations of 1710 may be performed according to the methods described herein. In some examples, aspects of the operations of 1710 may be performed by a message manager as described with reference to FIGS. 11 through 14.

At 1715, the base station may receive, from the UE, multiple instances of the first message based on the repetition pattern. The operations of 1715 may be performed according to the methods described herein. In some examples, aspects of the operations of 1715 may be performed by a random access manager as described with reference to FIGS. 11 through 14.

Figure 18:
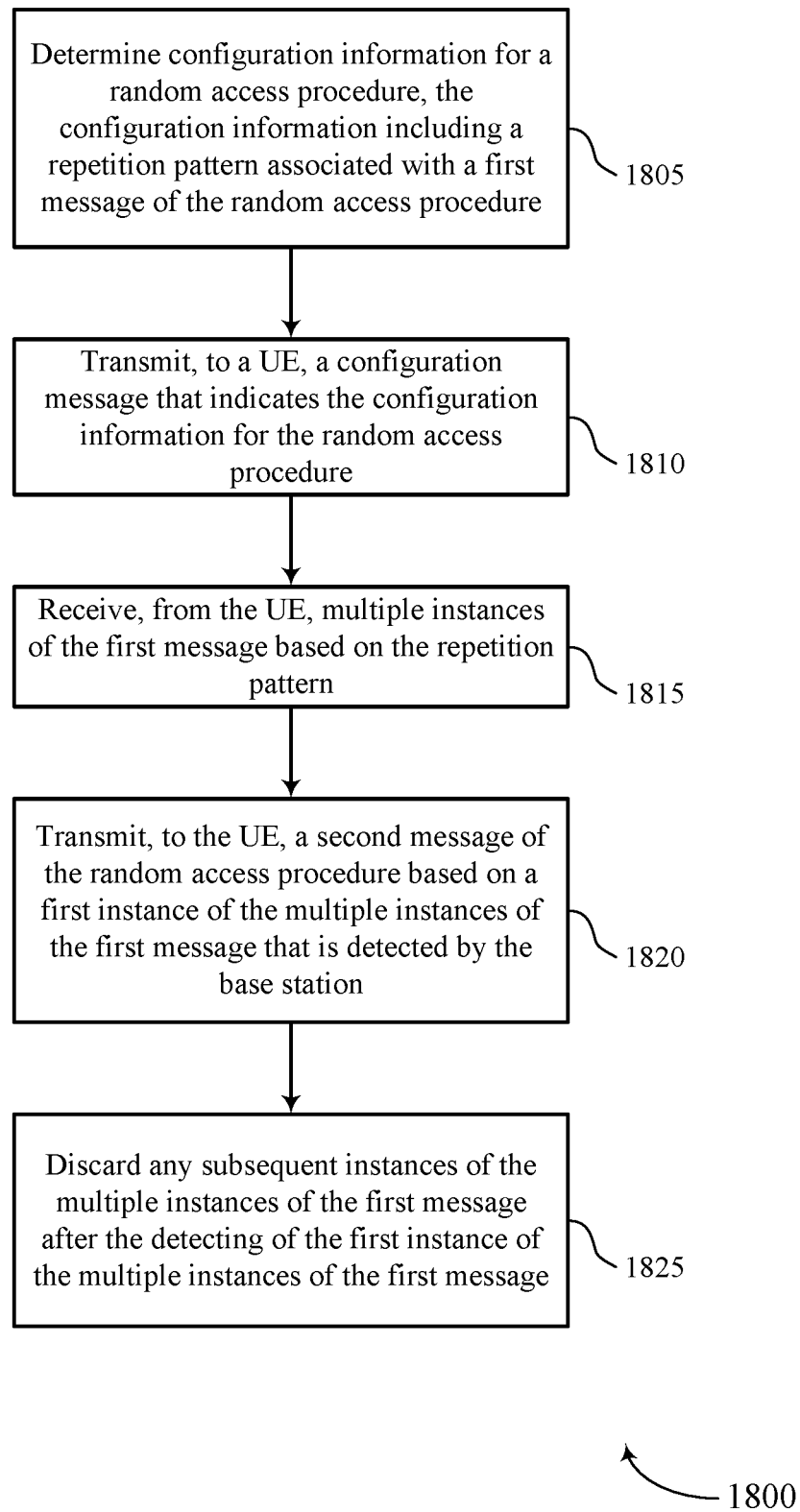

FIG. 18 shows a flowchart illustrating a method 1800 that supports channel repetitions for 2-step RACH procedure in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may determine configuration information for a random access procedure, the configuration information including a repetition pattern associated with a first message of the random access procedure. The operations of 1805 may be performed according to the methods described herein. In some examples, aspects of the operations of 1805 may be performed by a pattern manager as described with reference to FIGS. 11 through 14.

At 1810, the base station may transmit, to a UE, a configuration message that indicates the configuration information for the random access procedure. The operations of 1810 may be performed according to the methods described herein. In some examples, aspects of the operations of 1810 may be performed by a message manager as described with reference to FIGS. 11 through 14.

At 1815, the base station may receive, from the UE, multiple instances of the first message based on the repetition pattern. The operations of 1815 may be performed according to the methods described herein. In some examples, aspects of the operations of 1815 may be performed by a random access manager as described with reference to FIGS. 11 through 14.

At 1820, the base station may transmit, to the UE, a second message of the random access procedure based on a first instance of the multiple instances of the first message that is detected by the base station. The operations of 1820 may be performed according to the methods described herein. In some examples, aspects of the operations of 1820 may be performed by a message manager as described with reference to FIGS. 11 through 14.

At 1825, the base station may discard any subsequent instances of the multiple instances of the first message after the detecting of the first instance of the multiple instances of the first message. The operations of 1825 may be performed according to the methods described herein. In some examples, aspects of the operations of 1825 may be performed by a message manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication by a UE, comprising: receiving, from a base station, a configuration message that indicates configuration information for a random access procedure; determining a repetition pattern associated with a first message of the random access procedure based at least in part on the configuration information; and transmitting, to the base station, multiple instances of the first message based at least in part on the repetition pattern.

Aspect 2: The method of aspect 1, further comprising: monitoring for a second message of the random access procedure from the base station based at least in part on the configuration information.

Aspect 3: The method of aspect 2, further comprising: detecting the second message based at least in part on the monitoring; and ceasing the transmitting of the multiple instances of the first message based at least in part on detecting the second message.

Aspect 4: The method of aspect 3, further comprising: ceasing the monitoring for the second message based at least in part on detecting the second message.

Aspect 5: The method of any of aspects 2 through 4, further comprising: initiating the monitoring after transmitting a first instance of the multiple instances of the first message and before transmitting a last instance of the multiple instances of the first message.

Aspect 6: The method of any of aspects 2 through 5, wherein the second message of the random access procedure comprises a physical downlink control channel or a physical downlink shared channel, or both.

Aspect 7: The method of any of aspects 1 through 6, further comprising: receiving the configuration information in a radio resource control message or a synchronization signal block message, or both.

Aspect 8: The method of any of aspects 1 through 7, further comprising: determining that the repetition pattern indicates repeated transmissions of a pair of physical random access channel and physical uplink shared channel.

Aspect 9: The method of any of aspects 1 through 8, further comprising: determining that the repetition pattern indicates repeated transmissions of a physical random access channel followed by repeated transmissions of a physical uplink shared channel subsequent to a last instance of the repeated transmissions of the physical random access channel.

Aspect 10: The method of any of aspects 1 through 9, further comprising: determining a timing configuration of time resources associated with the transmitting of the multiple instances of the first message based at least in part on the configuration information.

Aspect 11: The method of any of aspects 1 through 10, further comprising: determining, based at least in part on the configuration information, a time gap configuration of the multiple instances of the first message indicating a spacing between a physical random access channel and a physical uplink shared channel, or a spacing between a first instance of a physical random access channel and a second instance of a physical random access channel, or a spacing between a first instance of a physical uplink shared channel and a second instance of a physical uplink shared channel, or a spacing between a first pair of physical random access channel and physical uplink shared channel and a second pair of physical random access channel and physical uplink shared channel, or any combination thereof.

Aspect 12: The method of any of aspects 1 through 11, further comprising: determining, based at least in part on the configuration information, a number of transmissions of a physical random access channel to be included in the transmitting of the multiple instances of the first message; and determining, based at least in part on the configuration information, a number of transmissions of a physical uplink shared channel to be included in the transmitting of the multiple instances of the first message.

Aspect 13: The method of aspect 12, wherein the number of transmissions of the physical random access channel is based at least in part on a channel condition associated with the physical random access channel or on a reference signal received power (RSRP) of a synchronization signal block (SSB) associated with the physical random access channel, or both.

Aspect 14: The method of any of aspects 12 through 13, wherein the number of transmissions of the physical uplink shared channel is based at least in part on a channel condition associated with the physical uplink shared channel or on a reference signal received power (RSRP) of a synchronization signal block (SSB) associated with the physical uplink shared channel, or both.

Aspect 15: The method of any of aspects 12 through 14, wherein the number of transmissions of the physical random access channel is equal to or different from the number of transmissions of the physical uplink shared channel.

Aspect 16: The method of any of aspects 1 through 15, wherein the random access procedure comprises a two-step random access procedure.

Aspect 17: A method for wireless communication by a base station, comprising: determining configuration information for a random access procedure, the configuration information including a repetition pattern associated with a first message of the random access procedure; transmitting, to a UE, a configuration message that indicates the configuration information for the random access procedure; and receiving, from the UE, multiple instances of the first message based at least in part on the repetition pattern.

Aspect 18: The method of aspect 17, further comprising: transmitting, to the UE, a second message of the random access procedure based at least in part on a first instance of the multiple instances of the first message that is detected by the base station.

Aspect 19: The method of aspect 18, further comprising: discarding any subsequent instances of the multiple instances of the first message after the detecting of the first instance of the multiple instances of the first message.

Aspect 20: The method of aspect 19, wherein the detecting of the first instance of the multiple instances comprises: detecting at least one instance of a physical random access channel and at least one instance of a physical uplink shared channel from the UE.

Aspect 21: The method of any of aspects 18 through 20, wherein the second message of the random access procedure comprises a physical downlink control channel or a physical downlink shared channel, or both.

Aspect 22: The method of any of aspects 17 through 21, further comprising: transmitting the configuration information in a radio resource control message or a synchronization signal block message, or both.

Aspect 23: The method of any of aspects 17 through 22, further comprising: configuring the repetition pattern to indicate repeated transmissions of a pair of physical random access channel and physical uplink shared channel.

Aspect 24: The method of any of aspects 17 through 23, further comprising: configuring the repetition pattern to indicate repeated transmissions of a physical random access channel followed by repeated transmissions of a physical uplink shared channel subsequent to a last instance of the repeated transmissions of the physical random access channel.

Aspect 25: The method of any of aspects 17 through 24, further comprising: configuring the configuration information to include a timing configuration of time resources associated with the multiple instances of the first message.

Aspect 26: The method of any of aspects 17 through 25, further comprising: configuring the configuration information to include a time gap configuration of the multiple instances of the first message, the time gap configuration indicating a spacing between a physical random access channel and a physical uplink shared channel, or a spacing between a first instance of a physical random access channel and a second instance of a physical random access channel, or a spacing between a first instance of a physical uplink shared channel and a second instance of a physical uplink shared channel, or a spacing between a first pair of physical random access channel and physical uplink shared channel and a second pair of physical random access channel and physical uplink shared channel, or any combination thereof.

Aspect 27: The method of any of aspects 17 through 26, further comprising: configuring the configuration information to indicate a number of transmissions of a physical random access channel to be included in the multiple instances of the first message; and configuring the configuration information to indicate a number of transmissions of a physical uplink shared channel to be included in the multiple instances of the first message.

Aspect 28: The method of aspect 27, further comprising: basing the number of transmissions of the physical random access channel at least in part on a channel condition associated with the physical random access channel or on a reference signal received power (RSRP) of a synchronization signal block (SSB) associated with the physical random access channel, or both.

Aspect 29: The method of any of aspects 27 through 28, further comprising: basing the number of transmissions of the physical uplink shared channel at least in part on a channel condition associated with the physical uplink shared channel or on a reference signal received power (RSRP) of a synchronization signal block (SSB) associated with the physical uplink shared channel, or both.

Aspect 30: The method of any of aspects 27 through 29, further comprising: setting the number of transmissions of the physical random access channel to be equal to or different from the number of transmissions of the physical uplink shared channel.

Aspect 31: The method of any of aspects 17 through 30, wherein the random access procedure comprises a two-step random access procedure.

Aspect 32: An apparatus for wireless communication by a UE, comprising a processor; memory coupled with the processor; and instructions stored in the memory and executable by the processor to cause the apparatus to perform a method of any of aspects 1 through 16.

Aspect 33: An apparatus for wireless communication by a UE, comprising at least one means for performing a method of any of aspects 1 through 16.

Aspect 34: A non-transitory computer-readable medium storing code for wireless communication by a UE, the code comprising instructions executable by a processor to perform a method of any of aspects 1 through 16.

Aspect 35: An apparatus for wireless communication by a base station, comprising a processor; memory coupled with the processor; and instructions stored in the memory and executable by the processor to cause the apparatus to perform a method of any of aspects 17 through 31.

Aspect 36: An apparatus for wireless communication by a base station, comprising at least one means for performing a method of any of aspects 17 through 31.

Aspect 37: A non-transitory computer-readable medium storing code for wireless communication by a base station, the code comprising instructions executable by a processor to perform a method of any of aspects 17 through 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving, from a base station, a configuration message that indicates configuration information for a random access procedure, wherein the configuration information includes an indication of a repetition pattern associated with a first message of the random access procedure, and wherein the repetition pattern indicates a quantity of consecutive transmissions of a physical random access channel;
   performing, based at least in part on the repetition pattern indicated in the configuration information, the quantity of consecutive transmissions of the physical random access channel;
   following a last transmission of the quantity of consecutive transmissions of the physical random access channel, performing, based at least in part on the repetition pattern indicated in the configuration information, repeated transmissions of a physical uplink shared channel associated with the first message;
   monitoring, based at least in part on performing a first repeated transmission of the physical uplink shared channel and based at least in part on the repetition pattern, for a second message of the random access procedure from the base station;
   detecting, based at least in part on the monitoring, the second message of the random access procedure from the base station prior to transmitting a last transmission of the repeated transmissions of the physical uplink shared channel; and
   ceasing remaining transmissions of the repeated transmissions of the physical uplink shared channel based at least in part on detecting the second message.

2. The method of claim 1, further comprising:
   ceasing the monitoring for the second message based at least in part on detecting the second message.

3. The method of claim 1, further comprising:
   initiating the monitoring after transmitting a first transmission of the repeated transmissions of the physical uplink shared channel and before transmitting the last transmission of the repeated transmissions of the physical uplink shared channel.

4. The method of claim 1, wherein the second message of the random access procedure comprises a physical downlink control channel, or a physical downlink shared channel, or both.

5. The method of claim 1, further comprising:
   receiving the configuration information in a radio resource control message, or a synchronization signal block message, or both.

6. The method of claim 1, further comprising:
   determining a timing configuration of time resources associated with transmission of the consecutive transmissions of the physical random access channel and the repeated transmissions of the physical uplink shared channel based at least in part on the configuration information.

7. The method of claim 1, further comprising:
   determining, based at least in part on the configuration information, a time gap configuration associated with the repetition pattern associated with of the first message, the time gap configuration indicating:
   a time gap between the last transmission of the quantity of consecutive transmissions of the physical random access channel and a first transmission of the repeated transmissions of the physical uplink shared channel, or
   a time gap between a first transmission of the quantity of consecutive transmissions of the physical random access channel and a second transmission of the quantity of consecutive transmissions of the physical random access channel, or
   a time gap between a first transmission of the repeated transmissions of the physical uplink shared channel and a second transmission of the repeated transmissions of the physical uplink shared channel, or
   any combination thereof.

8. The method of claim 1, further comprising:
   determining, based at least in part on the repetition pattern indicated in the configuration information, a quantity of repeated transmissions of the physical uplink shared channel, wherein performing the repeated transmissions of the physical uplink shared channel associated with the first message comprises performing the quantity of repeated transmissions of the physical uplink shared channel.

9. The method of claim 1, wherein the quantity of consecutive transmissions of the physical random access channel is based at least in part on a channel condition associated with the physical random access channel, or on a reference signal received power (RSRP) of a synchronization signal block (SSB) associated with the physical random access channel, or both.

10. The method of claim 8, wherein the quantity of repeated transmissions of the physical uplink shared channel is based at least in part on a channel condition associated with the physical uplink shared channel, or on a reference signal received power (RSRP) of a synchronization signal block (SSB) associated with the physical uplink shared channel, or both.

11. The method of claim 8, wherein the quantity of consecutive transmissions of the physical random access channel is equal to or different from the quantity of repeated transmissions of the physical uplink shared channel.

12. The method of claim 1, wherein the random access procedure comprises a two-step random access procedure.

13. A method for wireless communication by a base station, comprising:
configuring a repetition pattern associated with a first message of a random access procedure to indicate a quantity of consecutive transmissions of a physical random access channel followed by repeated transmissions of a physical uplink shared channel, wherein a first transmission of the repeated transmissions of the physical uplink shared channel is subsequent to a last transmission of the quantity of consecutive transmissions of the physical random access channel in the repetition pattern;
transmitting, to a user equipment (UE), a configuration message that indicates configuration information for the random access procedure, wherein the configuration information includes the repetition pattern associated with the first message of the random access procedure;
receiving, from the UE and based at least in part on the repetition pattern, the quantity of consecutive transmissions of the physical random access channel;
following the last transmission of the quantity of consecutive transmissions of the physical random access channel, receiving, from the UE, the repeated transmissions of the physical uplink shared channel;
transmitting, to the UE, a second message of the random access procedure, wherein remaining transmissions of the repeated transmissions of the physical uplink shared channel are ceased based at least in part on the second message; and
discarding any subsequent transmissions of the quantity of consecutive transmissions of the physical random access channel after detecting a first transmission of the quantity of consecutive transmissions of the physical random access channel.

14. The method of claim 13, further comprising:
transmitting, to the UE, the second message of the random access procedure based at least in part on the detecting of the first transmission of the quantity of consecutive transmissions of the physical random access channel.

15. The method of claim 13, wherein the second message of the random access procedure comprises a physical downlink control channel, or a physical downlink shared channel, or both.

16. The method of claim 13, further comprising:
transmitting the configuration information in a radio resource control message, or a synchronization signal block message, or both.

17. The method of claim 13, further comprising:
configuring the configuration information to include a timing configuration of time resources associated with the consecutive transmissions of the physical random access channel and the repeated transmissions of the physical uplink shared channel.

18. The method of claim 13, further comprising:
configuring the configuration information to include a time gap configuration associated with the repetition pattern associated with the first message, the time gap configuration indicating:
a time gap between the last transmission of the quantity of consecutive transmissions of the physical random access channel and the first transmission of the repeated transmissions of the physical uplink shared channel, or
a time gap between a first transmission of the quantity of consecutive transmissions of the physical random access channel and a second transmission of the quantity of consecutive transmissions of the physical random access channel, or
a time gap between the first transmission of the repeated transmissions of the physical uplink shared channel and a second transmission of the repeated transmissions of the physical uplink shared channel, or
any combination thereof.

19. The method of claim 13, further comprising:
configuring the configuration information to indicate a quantity of repeated transmissions of the physical uplink shared channel, wherein receiving the repeated transmissions of the physical uplink shared channel comprises receiving the quantity of repeated transmissions of the physical uplink shared channel.

20. The method of claim 19, wherein the quantity of consecutive transmissions of the physical random access channel is based at least in part on a channel condition associated with the physical random access channel, or on a reference signal received power (RSRP) of a synchronization signal block (SSB) associated with the physical random access channel, or both.

21. An apparatus for wireless communication by a user equipment (UE), comprising:
one or more memories; and
one or more processors coupled with the one or more memories and configured to cause the UE to:
receive, from a base station, a configuration message that indicates configuration information for a random access procedure, wherein the configuration information includes an indication of a repetition pattern associated with a first message of the random access procedure, and wherein the repetition pattern indicates a quantity of consecutive transmissions of a physical random access channel;
perform based at least in part on the repetition pattern indicated in the configuration information, the quantity of consecutive transmissions of the physical random access channel;
following a last transmission of the quantity of consecutive transmissions of the physical random access channel, perform, based at least in part on the repetition pattern indicated in the configuration information, repeated transmissions of a physical uplink shared channel associated with the first message;

detect a second message of the random access procedure from the base station prior to transmission of a last transmission of the repeated transmissions of the physical uplink shared channel; and cease remaining transmissions of the repeated transmissions of the physical uplink shared channel based at least in part on detecting the second message.

22. An apparatus for wireless communication by a base station, comprising:

one or more memories; and one or more processors coupled with the one or more memories and configured to cause the base station to:

configure a repetition pattern associated with a first message of a random access procedure to indicate a quantity of consecutive transmissions of a physical random access channel followed by repeated transmissions of a physical uplink shared channel, wherein a first transmission of the repeated transmissions of the physical uplink shared channel is subsequent to a last transmission of the quantity of consecutive transmissions of the physical random access channel in the repetition pattern;

transmit, to a user equipment (UE), a configuration message that indicates configuration information for the random access procedure, wherein the configuration information includes the repetition pattern associated with the first message of the random access procedure;

receive, from the UE and based at least in part on the repetition pattern, the quantity of consecutive transmissions of the physical random access channel;

following the last transmission of the quantity of consecutive transmissions of the physical random access channel, receive, from the UE, the repeated transmissions of the physical uplink shared channel;

transmit, to the UE, a second message of the random access procedure, wherein remaining transmissions of the repeated transmissions of the physical uplink shared channel are ceased based at least in part on the second message; and discard any subsequent transmissions of the quantity of consecutive transmissions of the physical random access channel after detecting the first transmission of the quantity of consecutive transmissions of the physical random access channel.

* * * * *